US011210072B2

(12) United States Patent
Neeman

(10) Patent No.: US 11,210,072 B2
(45) Date of Patent: Dec. 28, 2021

(54) SYSTEM FOR GENERATING A MAP ILLUSTRATING BINDINGS

(71) Applicant: SPLUNK INC., San Francisco, CA (US)

(72) Inventor: Itay A. Neeman, Seattle, WA (US)

(73) Assignee: SPLUNK Inc., San Francisco, CA (US)

( * ) Notice: Subject to any disclaimer, the term of this patent is extended or adjusted under 35 U.S.C. 154(b) by 0 days.

(21) Appl. No.: 16/828,795

(22) Filed: Mar. 24, 2020

(65) Prior Publication Data
US 2020/0264853 A1 Aug. 20, 2020

Related U.S. Application Data

(63) Continuation of application No. 16/133,898, filed on Sep. 18, 2018, now Pat. No. 10,656,924, which is a continuation of application No. 15/421,248, filed on Jan. 31, 2017, now Pat. No. 10,108,403, which is a continuation of application No. 14/305,977, filed on Jun. 16, 2014, now Pat. No. 9,594,545, which is a continuation-in-part of application No. 13/910,899, filed on Jun. 5, 2013, now Pat. No. 8,756,593.

(51) Int. Cl.
| | |
|---|---|
| *G06F 8/41* | (2018.01) |
| *G06F 8/70* | (2018.01) |
| *G06F 8/54* | (2018.01) |
| *G06F 8/71* | (2018.01) |

(52) U.S. Cl.
CPC ............... *G06F 8/434* (2013.01); *G06F 8/54* (2013.01); *G06F 8/70* (2013.01); *G06F 8/71* (2013.01)

(58) Field of Classification Search
CPC ......... G06F 8/434; G06F 8/54; G06F 8/70–71
USPC .................................................. 717/107–123
See application file for complete search history.

(56) References Cited

U.S. PATENT DOCUMENTS

| | | |
|---|---|---|
| 4,558,413 A | 12/1985 | Schmidt et al. |
| 5,430,850 A | 7/1995 | Papadopoulos et al. |

(Continued)

OTHER PUBLICATIONS

Haas et al., "Temporal Binding of Multimodal Controls for Dynamic Map Displays: A Systems Approach", ACM, pp. 409-415 (Year: 2011).*

(Continued)

*Primary Examiner* — Anil Khatri
(74) *Attorney, Agent, or Firm* — Shook, Hardy & Bacon L.L.P.

(57) ABSTRACT

The disclosed embodiments relate to a system that facilitates developing applications in a component-based software development environment. This system provides an execution environment comprising instances of application components and a registry that maps names to instances of application components. Within the registry, each entry is associated with a list of notification dependencies that specifies component instances to be notified when the registry entry changes. Upon receiving a command to display notification dependencies for the registry, the system generates and displays a dependency graph containing nodes representing component instances and arrows between the nodes representing notification dependencies between the component instances. Upon receiving a command to display a timeline for with the registry, the system generates and displays a timeline representing events associated with the registry in chronological order.

20 Claims, 20 Drawing Sheets

(56) References Cited

U.S. PATENT DOCUMENTS

| | | |
|---|---|---|
| 5,485,616 A | 1/1996 | Burke et al. |
| 5,805,891 A | 9/1998 | Bizuneh et al. |
| 5,815,703 A | 9/1998 | Copeland et al. |
| 5,872,974 A * | 2/1999 | Mezick ............... G06F 8/30 717/109 |
| 5,907,837 A | 5/1999 | Ferrel et al. |
| 5,950,001 A * | 9/1999 | Hamilton ............ G06F 9/4488 717/107 |
| 6,014,666 A * | 1/2000 | Holland ............... G06F 9/468 |
| 6,029,207 A | 2/2000 | Heninger |
| 6,044,224 A | 3/2000 | Radia et al. |
| 6,093,215 A | 7/2000 | Buxton et al. |
| 6,154,878 A | 11/2000 | Saboff |
| 6,275,976 B1 * | 8/2001 | Scandura ........... G06F 11/3608 714/E11.208 |
| 6,332,219 B1 | 12/2001 | Curtis et al. |
| 6,367,077 B1 | 4/2002 | Brodersen et al. |
| 6,370,686 B1 | 4/2002 | Delo et al. |
| 6,377,975 B1 | 4/2002 | Florman |
| 6,389,589 B1 | 5/2002 | Mishra et al. |
| 6,405,364 B1 * | 6/2002 | Bowman-Amuah .. G06Q 10/06 717/101 |
| 6,424,991 B1 | 7/2002 | Gish |
| 6,437,805 B1 * | 8/2002 | Sojoodi ............ G05B 19/0426 715/763 |
| 6,442,620 B1 | 8/2002 | Thatte et al. |
| 6,467,075 B1 | 10/2002 | Sato et al. |
| 6,487,713 B1 * | 11/2002 | Cohen ................ G06F 8/34 717/105 |
| 6,499,137 B1 | 12/2002 | Hunt |
| 6,523,027 B1 | 2/2003 | Underwood |
| 6,594,822 B1 | 7/2003 | Schweitz et al. |
| 6,598,225 B1 | 7/2003 | Curtis et al. |
| 6,606,744 B1 | 8/2003 | Mikurak |
| 6,640,238 B1 | 10/2003 | Bowman-Amuah |
| 6,721,941 B1 | 4/2004 | Morshed et al. |
| 6,738,964 B1 * | 5/2004 | Zink ................... G06F 30/30 717/105 |
| 6,745,385 B1 | 6/2004 | Lupu et al. |
| 6,754,882 B1 * | 6/2004 | Sanchez ............. G06F 30/30 716/117 |
| 6,760,903 B1 | 7/2004 | Morshed et al. |
| 6,779,177 B1 | 8/2004 | Bahrs et al. |
| 6,910,208 B1 | 6/2005 | Zimniewicz |
| 6,957,422 B2 | 10/2005 | Hunt |
| 7,000,219 B2 * | 2/2006 | Barrett ............... G06F 8/24 717/107 |
| 7,003,517 B1 | 2/2006 | Seibel et al. |
| 7,043,535 B2 | 5/2006 | Chi et al. |
| 7,069,540 B1 | 6/2006 | Sievert |
| 7,096,253 B2 | 8/2006 | Vinson et al. |
| 7,103,873 B2 * | 9/2006 | Tanner ................ G06F 9/451 717/109 |
| 7,150,015 B2 | 12/2006 | Pace et al. |
| 7,155,701 B1 | 12/2006 | Gongwer et al. |
| 7,203,696 B2 | 4/2007 | Atm |
| 7,234,147 B1 | 6/2007 | Gharavy et al. |
| 7,275,079 B2 | 9/2007 | Brodsky et al. |
| 7,305,671 B2 | 12/2007 | Davidov et al. |
| 7,321,897 B2 | 1/2008 | Ondrusek et al. |
| 7,322,028 B2 | 1/2008 | Belovich |
| 7,360,087 B2 | 4/2008 | Jorgensen et al. |
| 7,406,483 B2 * | 7/2008 | Leymann ........... G06Q 10/10 717/174 |
| 7,430,610 B2 | 9/2008 | Pace et al. |
| 7,487,204 B2 | 2/2009 | Asthana et al. |
| 7,493,594 B2 * | 2/2009 | Shenfield ............ G06F 8/10 717/102 |
| 7,506,338 B2 | 3/2009 | Alpern et al. |
| 7,640,491 B2 | 12/2009 | Goodacre et al. |
| 7,644,406 B2 * | 1/2010 | Gustafson ............ G06F 8/65 717/172 |
| 7,653,900 B2 | 1/2010 | Kinderknecht et al. |
| 7,665,081 B1 | 2/2010 | Pavlyushchik |
| 7,690,033 B2 | 3/2010 | Pernia |
| 7,725,889 B2 | 5/2010 | Gustafson et al. |
| 7,735,076 B2 | 6/2010 | Sawyer |
| 7,739,677 B1 | 6/2010 | Kekre et al. |
| 7,747,997 B1 | 6/2010 | Rao |
| 7,783,763 B2 | 8/2010 | Tuel |
| 7,793,279 B1 | 9/2010 | Le et al. |
| 7,802,246 B1 | 9/2010 | Kennedy et al. |
| 7,805,719 B2 | 9/2010 | O'Neill |
| 7,818,736 B2 | 10/2010 | Appavoo et al. |
| 7,853,643 B1 | 12/2010 | Martinez et al. |
| 7,861,238 B2 | 12/2010 | Saadi et al. |
| 7,865,888 B1 | 1/2011 | Qureshi et al. |
| 7,870,535 B2 * | 1/2011 | Rippert, Jr. ............. G06F 11/36 717/100 |
| 7,926,051 B2 | 4/2011 | Barta et al. |
| 7,930,273 B1 | 4/2011 | Clark et al. |
| 7,937,344 B2 | 5/2011 | Baum et al. |
| 8,006,240 B2 | 8/2011 | Bhatkhande et al. |
| 8,082,550 B2 | 12/2011 | O'Toole, Jr. |
| 8,112,425 B2 | 2/2012 | Baum et al. |
| 8,146,075 B2 | 3/2012 | Mahajan |
| 8,245,216 B2 | 8/2012 | Felts |
| 8,291,378 B2 * | 10/2012 | Arnold ................ G06F 8/61 717/120 |
| 8,302,092 B2 | 10/2012 | Alverson et al. |
| 8,365,164 B1 * | 1/2013 | Morgenstern ............ G06F 8/61 717/175 |
| 8,370,794 B2 * | 2/2013 | Moosmann ............. G06F 8/10 717/104 |
| 8,375,381 B1 | 2/2013 | Clark et al. |
| 8,375,384 B2 | 2/2013 | Mahajan et al. |
| 8,407,682 B2 | 3/2013 | Reisman |
| 8,407,689 B2 | 3/2013 | Dournov et al. |
| 8,458,695 B2 | 6/2013 | Fitzgerald et al. |
| 8,479,188 B2 | 7/2013 | Singh et al. |
| 8,495,611 B2 | 7/2013 | McCarthy et al. |
| 8,499,030 B1 | 7/2013 | Reisman |
| 8,522,228 B1 | 8/2013 | Le et al. |
| 8,527,979 B2 | 9/2013 | Wookey |
| 8,589,876 B1 | 11/2013 | Neeman |
| 8,595,715 B2 | 11/2013 | Ward et al. |
| 8,645,939 B2 | 2/2014 | Felts |
| 8,751,529 B2 | 6/2014 | Zhang et al. |
| 8,756,593 B2 | 6/2014 | Neeman |
| 8,756,614 B2 | 6/2014 | Neeman |
| 8,776,038 B2 | 7/2014 | Larimore et al. |
| 8,788,525 B2 | 7/2014 | Neels et al. |
| 9,009,693 B2 | 4/2015 | St. John et al. |
| 9,215,240 B2 | 12/2015 | Merza et al. |
| 9,229,985 B2 | 1/2016 | Neeman |
| 9,286,413 B1 | 3/2016 | Coates et al. |
| 9,557,879 B1 | 1/2017 | Wang et al. |
| 9,594,545 B2 | 3/2017 | Neeman |
| 9,836,336 B2 | 12/2017 | Neeman |
| 10,061,626 B2 | 8/2018 | Neeman |
| 10,108,403 B2 | 10/2018 | Neeman |
| 10,127,258 B2 | 11/2018 | Lamas et al. |
| 10,235,221 B2 | 3/2019 | Neeman |
| 10,318,360 B2 | 6/2019 | Neeman |
| 10,333,820 B1 | 6/2019 | Wang et al. |
| 10,387,423 B2 | 8/2019 | Woo |
| 10,419,465 B2 | 9/2019 | Muddu et al. |
| 10,452,366 B2 * | 10/2019 | Daniel ................ G06F 8/36 |
| 10,481,893 B1 | 11/2019 | Righi et al. |
| 2006/0123383 A1 * | 6/2006 | Apte .................. G06F 8/61 717/100 |
| 2008/0301658 A1 | 12/2008 | El-Kersh |
| 2009/0144726 A1 | 6/2009 | Felts |
| 2009/0183150 A1 | 7/2009 | Felts |
| 2009/0193054 A1 | 7/2009 | Karimisetty et al. |
| 2009/0193504 A1 | 7/2009 | Kobayashi et al. |
| 2011/0191763 A1 | 8/2011 | Balassanian |
| 2011/0197065 A1 | 8/2011 | Stauth et al. |
| 2011/0225599 A1 | 9/2011 | Lue-Sang et al. |
| 2012/0109937 A1 | 5/2012 | Liensberger et al. |
| 2012/0185666 A1 | 7/2012 | Channabasappa et al. |
| 2012/0253548 A1 | 10/2012 | Davidson |
| 2013/0239115 A1 | 9/2013 | Kato |

(56) References Cited

U.S. PATENT DOCUMENTS

| | | |
|---|---|---|
| 2013/0276000 A1 | 10/2013 | Neeman |
| 2013/0318514 A1 | 11/2013 | Neeman |
| 2014/0250420 A1 | 9/2014 | Smith et al. |
| 2014/0309970 A1 | 10/2014 | Kelsey et al. |
| 2018/0317570 A1 | 11/2018 | Diaz et al. |
| 2019/0098106 A1 | 3/2019 | Mungel et al. |
| 2019/0187981 A1 | 6/2019 | Neeman |
| 2019/0250965 A1 | 8/2019 | Neeman |

OTHER PUBLICATIONS

Krisper et al., "Describing Binding Time in Software Design Patterns", ACM, pp. 1-15 (Year: 2016).*
Mohanty et al., "Rapid System-Level Performance Evaluation and Optimization for Application Mapping onto SoC Architectures", IEEE, pp. 160-167 (Year: 2002).*
Radu et al, "Optimizing Application Mapping Algorithms for Noes through a Unified Framework", IEEE, pp. 259-264 (Year: 2010).*
Boddetiet al, "A Framework for Binding and Retrieving Class-Specific Information to and from Image Patterns Using Correlation Filters", IEEE, 2064-2077 (Year: 2013).*
Heinrich et al., "Data Binding for Standard-based Web Applications", ACM, pp. 652-657 (Year: 2012).*
Atkinson, C., and Hummel, O., "Iterative and Incremental Development of Component-Based Software Architectures", ACM, pp. 77-82 (Jun. 2012).
Bazzi, R., et al., "Dynamic Software Updates: The State Mapping Problem," Conference: Proceedings of the 2nd ACM Workshop on Hot Topics in Software Upgrades, HotSWUp 2009, Orlando, FL, USA, pp. 1-2 (2009).
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010, 09 pages.
Boutin, F., et al., "Focus Dependent Multi Level Graph Clustering", ACM, pp. 167-170 (2004).
Breivold, H.P., and Larsson, M., "Component-Based and Service-Oriented Software Engineering: Key Concepts and Principles", 33rd EUROMICRO Conference on Software Engineering and Advanced Applications, IEEE, pp. 1-8 (2007).
Butler, R., et al., "CPVM: Customizable Portable Virtual Machines", ACM, pp. 616-619 (2006).
Carasso, David, "Exploring Splunk," published by CITO Research, New York, NY, Apr. 2012, 156 pages.
Cherif, S., et al., "Adaptable Web Service Registry for Publishing Context Aware Service Composition," iiWAS '15 Proceedings of the 17th International Conference on Information Integration and Web-based Applications & Services, ACM, pp. 1-8 (2015).
Ducournau, R., "Implementing Statically Types Object-Oriented Programming Languages", ACM Computing Surveys, vol. 43, No. 3, Article 18, pp. 1-48 (2011).
Elkarablieh, B., et al., "Precise Pointer Reasoning for Dynamic Test Generation", ACM, pp. 129-139 (2009).
Gill, N.S., "Importance of Software Component Characterization for Better Software Reusability", ACM SIGSOFT Software Engineering Notes, vol. 31, Issue 1, pp. 1-3 (Jan. 2006).
Ha, Y., and LEE, R."Integration of Semantic Web Service and Component-Based Development for e-business environment," Fourth International Conference on Software Engineering Research, Management and Applications (SERA'06), pp. 1-8 (2006).
Hummel, J., et al., "A General Data Dependence Test for Dynamic, Pointer-Based Data Structures," AMC, pp. 218-229 (1994).
Ishak, R., et al., "Multitraining sensor networks with bipartite conflict graphs", ACM, pp. 55-59 (2006).
Kalali, B., et al., "A Service-Oriented Monitoring Registry," GASCON '03: Proceedings of the 2003 conference of the Centre for Advanced Studies on Collaborative research, ACM, pp. 107-121 (2003).
Kim, Y., and Hong, D., "Windows Registry and Hiding Suspects' Secret in Registry," 2008 International Conference on Information Security and Assurance (isa 2008), pp. 393-398 (2008).
Khattak, Y., and Barrett, S., "Primitive components: towards more flexible black box aop," In Proceedings of the 1st International Workshop on Context-Aware Middleware and Services: affiliated with the 4th International Conference on Communication System Software and Middleware (COMSWARE 2009), ACM, pp. 24-30 (Jun. 2009).
Kumar, P., et al., "Visualization of Clustered Directed Acyclic Graphs with Node Interleaving", SAC '09: Proceedings of the 2009 ACM symposium on Applied Computing, ACM, pp. 1800-1805 (2009).
Kumari, U., et al., "A Composite Complexity Measure for Component-Based Systems", ACM SIGSOFT Software Engineering Notes, vol. 36, No. 6, pp. 1-5 (2011).
Lee, K.-H., et al., "Method to Integrate Business Registries by Using OWL-S Ontologies," International Conference on Next Generation Web Services Practices (NWeSP'05), pp. 1-6 (2005).
Lyde, S., et al., "Control-Flow Analysis of Dynamic Languages via Pointer Analysis", ACM, pp. 54-62 (2015).
Marlow, S., et al., "Faster Laziness Using Dynamic Pointer Tagging", AMC, pp. 227-288 (2007).
Natour, A., "On the Control Dependence in the Program Dependence Graph", ACM, pp. 510-519 (1988).
Priestley, M., "Scenario-Based and Model-Driven Information Development with XML DITA", ACM, pp. 45-51 (2003).
Rafailidis, D., "Clustering Nodes with Attributes via Graph Alignment", ACM, pp. 904-907 (2016).
Sellami, M., et al., "An Implicit Approach for Building Communities of Web Service Registries," ACM, pp. 230-237 (2011).
Splunk Enterprise 8.0.0 Overview, available online, retrieved May 20, 2020 from docs.splunk.com, 17 pages.
Splunk Cloud 8.0.2004 User Manual, available online, retrieved May 20, 2020 from docs.splunk.com, 66 pages.
Splunk Quick Reference Guide, updated 2019, available online at https://www.splunk.com/pdfs/solution-guides/splunk-quick-reference-guide.pdf, retrieved May 20, 2020, 06 pages.
Stefanidakis, M., et al., "A decentralized infrastructure for the efficient management of resources in the web of data", ACM, pp. 1-8, (2012).
Stoyle, G., et al., "Mutatis Mutandis: Safe and Predictable Dynamic Software Updating", ACM Transactions on Programming Languages and Systems, vol. 29, No. 4, Article 22, pp. 1-70 (2007).
Stoyle, G., et al., "Mutatis mutandis: safe and predictable dynamic software updating", ACM, vol. 40, Issue 1, pp. 183-194 (Jan. 2005).
Zhang, X., et al., "Dynamic Pointer Alignment: Tiling and Communication Optimization for Parallel Pointer-based Computations", ACM, pp. 37-47 (1997).
Zhao, P., et al., "Grid Metadata Catalog Service-Based OGC Web Registry Service," GIS '04: Proceedings of the 12th annual ACM international workshop on Geographic information systems, pp. 22-30 (2004).

\* cited by examiner

Bindings:

Pointer definitions:

SYSTEM FOR GENERATING A MAP ILLUSTRATING BINDINGS

CROSS-REFERENCE TO RELATED APPLICATIONS

This application is a Continuation of U.S. patent application Ser. No. 16/133,898 filed Sep. 18, 2018, which is itself a Continuation of U.S. patent application Ser. No. 15/421,248 filed on Jan. 31, 2017, now issued as U.S. Pat. No. 10,108,403, which is a continuation of U.S. patent application Ser. No. 14/305,977 filed on Jun. 16, 2014, now issued as U.S. Pat. No. 9,594,545, which is a continuation-in-part of U.S. patent application Ser. No. 13/910,899 filed on Jun. 5, 2013, now issued as U.S. Pat. No. 8,756,593. The entire contents of each of the forgoing are hereby incorporated by reference.

RELATED ART

The disclosed embodiments generally relate to techniques for developing applications for computer systems. More specifically, the disclosed embodiments relate to an application framework that provides a central registry for mapping names to instances of application components.

BACKGROUND

Recent advances in software engineering have been facilitated by component-based software engineering techniques that encapsulate application functionality into a set of reusable software components. Software components, which are often implemented as objects, comprise a set of semantically related functions and data and may exist autonomously from other components in a computer system. Moreover, software components can produce or consume events to facilitate event-driven architectures (EDAs), which are useful for implementing user interfaces.

Software components typically provide interfaces specifying services that other components (and other application code) can utilize. Moreover, software components are "replaceable," which means that an original component instance can be replaced with a new component instance (at design time or run-time) if the new component instance provides at least the same functionality as the original component instance.

One complication that arises during development of a component-based software system is that when a new component instance is developed to replace an original component instance, all of the components that accessed the original component instance must be modified to access the new component instance. If many components need to be modified, this modification process can involve a lot of time-consuming manual work and can also introduce errors into the system.

Hence, what is needed is a software-development system that facilitates replacing an original component instance with a new component instance without having to manually modify all of the code that accesses the original component instance.

DETAILED DESCRIPTION

Overview

Figure 1A:
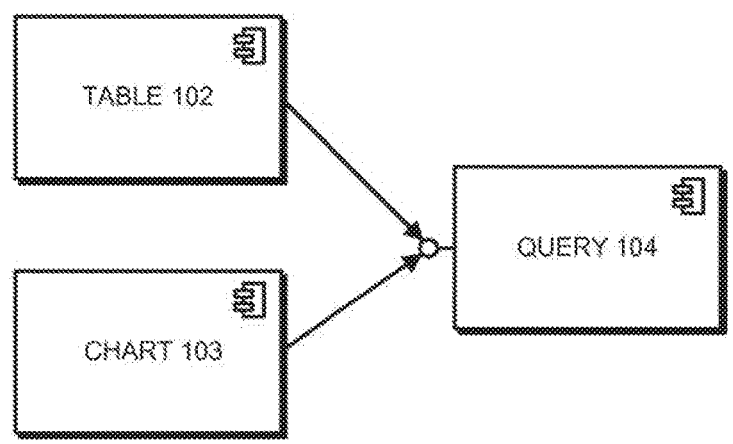
FIG. 1A illustrates several application components in a component-based software system in accordance with the disclosed embodiments.

The disclosed embodiments relate to the design of an application framework that enables instances of application components to refer to and communicate with each other through a central registry. This central registry stores mappings from names to instances of application components, and enables application components and external tools to be notified of changes to specific mappings in the registry when the changes happen.

For example, consider a web page with the following components:
1. A search query—the query;
2. A chart that will display results from the query—the chart; and
3. A table that will display results from the query—the table.

In the above three components, there is an implicit dependency chain: the query depends on nothing, but both the chart and the table depend on the query and do not depend on each other.

In a conventional software-development environment, the programmer must create each component in a specific order to satisfy the dependency chain. In the example above, the programmer first has to first create the query, and only after the query is created the programmer can create the chart and table. As the dependency chain becomes more complex, these restrictions can become more and more complicated to follow and the system can become much harder to maintain.

By providing a central registry that maps names to instances of application components, when the programmer creates the chart and table, instead of providing the actual instance of the query, the programmer can simply provide a name identifying the query. Rather than the chart and table being bound to a specific instance of a query, they are bound to a specific name of the query. The chart and table components are then programmed to be notified of any changes on that name, and can react appropriately. For example, suppose we have the following creation order:
1. Create a table with name "mytable" with a query called "myquery";
2. Create a chart with name "mychart" with a query called "myquery; and Create a query called "myquery".

When the query is finally created in step 3, the registry will notify both the table and the chart and they will make use of the newly available instance appropriately. Note that this logic will work transparently with any ordering, even if the query (with name "myquery") had been created prior to the chart and table being created. Hence, by using this system, we have decoupled the dependency chain from the creation order, and have allowed for indirect binding of component instances to each other.

In the above example, imagine we have a second search query, query2 and we want to be able dynamically switch between query and query2, without needing to create new instances of the chart and the table. In a conventional software-development environment, we would have to manually go into each individual component and give it the new query instance. This is both error-prone (you may forget a particular component) and cumbersome (different components may expose different interfaces for passing in a new query instance, or none at all). By using the central registry, however, we can simply change the instance that the "myquery" name points to in the Registry. The associated components will then be notified of this change and can transparently make use of the new query instance.

Continuing with the example above, suppose we want the chart and the table to display information from a different query. Instead of having to change the raw instances that each one of them points to, we can simply change the name of the query they are using (wherein query is registered on "myquery" and query2 is registered on "myotherquery"). So for example, we can tell the table to change the name from "myquery" to "myotherquery." The table will then dynamically pick up any query instance at that name, whether it is already created or will be created in the future.

Extending the above example, suppose we want to be able to examine the state of the page and its components at any time. For example, we might want to know which search queries particular tables are using. With a conventional software-development system, this could be quite complicated without intimate knowledge about the structure of the page and the implementation of the components, and may be impossible if this information is not exposed in some way. Hence, it becomes the duty of the writer of the page (and possibly the writer of the components too) to expose this information. However, by using a central registry, we obtain the ability to do this introspection for free. For example, we can easily ask the following of the registry:
1. What components exist on the page?
2. What components are linked to other components (along with identities of the other components)?
3. Send notifications when particular components change.

Note that the writer of the page has to do nothing except use the registry, and this introspection ability becomes available at no performance cost.

In a conventional component-based software-development environment, the above table, chart and query example can be implemented as is illustrated in FIG. 1A, wherein a table instance 102 and a chart instance 103 both access an interface exposed by a query instance 104. In this example, if a programmer would like to replace the query instance 104 with a new query instance, the programmer would have to manually modify the code in both the table instance 102 and the chart instance 103 to access the new query instance.

Figure 1B:
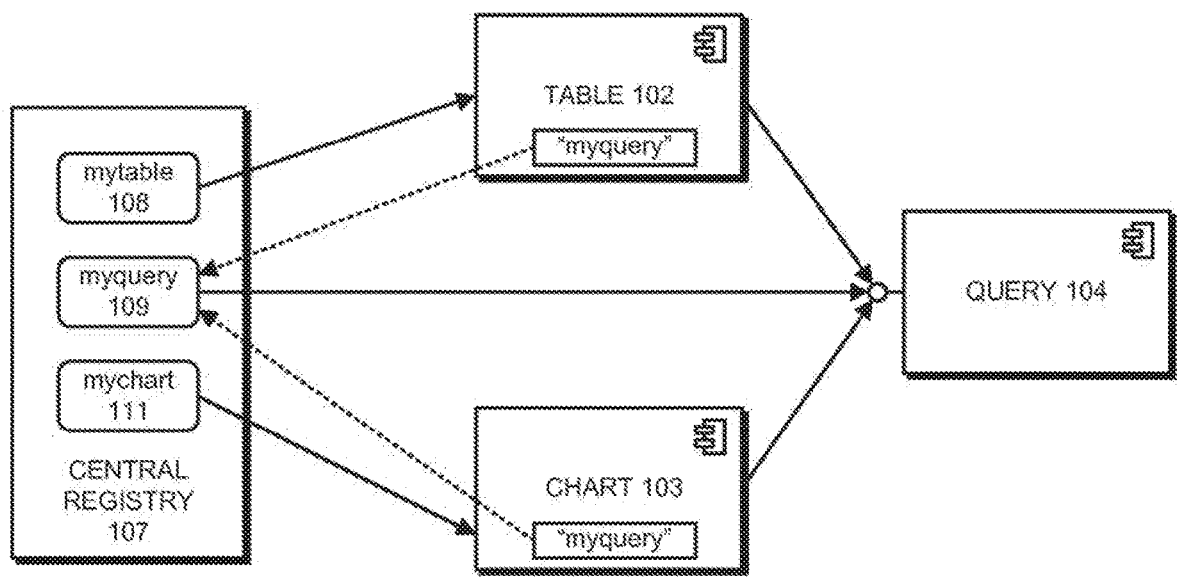
FIG. 1B illustrates how a registry can be used in a component-based software system in accordance with the disclosed embodiments.

In contrast, FIG. 1B illustrates how the same example can be implemented using a central registry 107 that keeps track of mappings between names and component instances. In this case, central registry 107 contains: an entry 108 that maps the name "mytable" to table instance 102; an entry 111 that maps the name "mychart" to chart instance 103; and an entry 109 that maps the name "myquery" to query instance 104.

In this example, table instance 102 and chart instance 103 still both access the interface for query instance 104. However, both table instance 102 and chart instance 103 are programmed to access query instance 104 through the name "myquery," instead of being hard-coded to access the query instance 104 directly. This means that table instance 102 and chart instance 103 will both perform a lookup in central registry 107 based on the name "myquery" to access query instance 104. Also, table instance 102 and chart instance 103 are programmed to request to be notified if the mapping for "myquery" to query instance 104 changes. They are also programmed to deal with such mapping changes if notified. Hence, if the entry for "myquery" 109 in central registry 107 is updated to map to another query instance, table instance 102 and chart instance 103 will be automatically updated to access the new query instance.

In some embodiments, the system provides an application-programming interface (API) to facilitate the above-described accesses to central registry 107. For example, an exemplary API can define the following functions:
(1) registerInstance(name, component)—creates or updates a registry entry to map the name to the component;
(2) revokeInstance(name)—deletes a registry entry for the name;
(3) hasInstance(name)—returns a Boolean value indicating whether an entry for the name exists in the registry;
(4) getInstance(name)—returns a reference to a component that is mapped by the directory to name;
(5) onChange(name, callback)—when an entry for name is modified in the registry, this function causes a "callback" function to be called (if the registry entry for the name has been modified to map the name to a new component instance, wherein a reference to the new component instance is an input parameter to the callback function);
(6) getInstances( )—returns all instances contained in entries in the registry; and
(7) getInstanceNames( )—returns all names contained in entries in the registry.

Note that functions (1)-(5) are used by programmers to write code that automatically handles changes to registry entries, and functions (6)-(7) are useful for obtaining diagnostic information from central registry 107. Note that an empty registry entry gets created during an initial startup phase for an execution environment, and subsequent calls to RegisterInstance( ) or OnChange( ) create and/or modify entries in the registry.

Figure 1C:
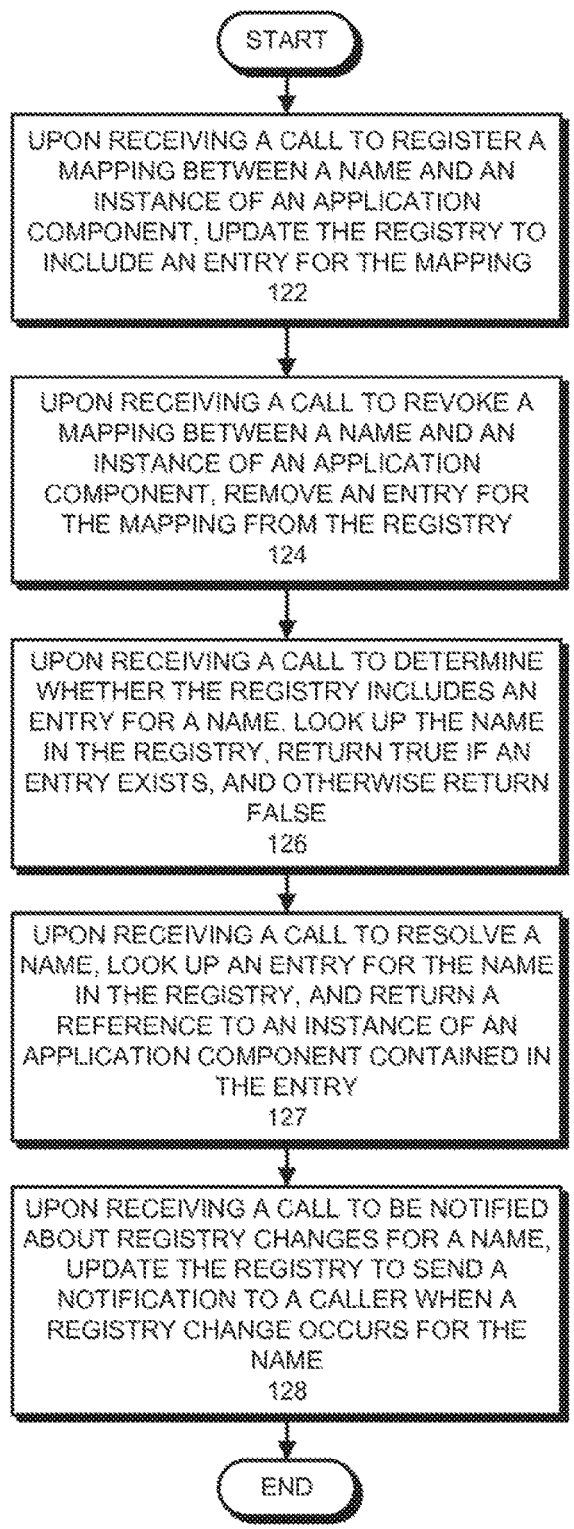
FIG. 1C presents a flow chart illustrating how the system processes calls related to the central registry in accordance with the disclosed embodiments.

During operation of the above-described system, functions (1)-(5) can be called as is illustrated in the flow chart that appears in FIG. 1C. More specifically, upon receiving a call to register a mapping between a name and an instance of an application component (e.g., a call to registerInstance( )), the system creates or updates a registry entry for the mapping (step 122). Upon receiving a call to revoke a mapping between a name and an instance of an application component (e.g., a call to revokeInstance( ), the system removes an entry for the mapping from the registry (step 124). Upon receiving a call to determine whether the registry includes an entry for a name (e.g., a call to hasInstance( ), the system looks up the name in the registry, returns TRUE if the entry exists, and otherwise returns FALSE (step 126). Upon receiving a call to resolve a name (e.g., a call to getInstance( ), the system looks up an entry for the name in the registry, and returns a reference to an instance of an application component contained in the entry (step 127). Finally, upon receiving a call to be notified about registry changes for a name (e.g., a call to onChangeQ), the system updates the registry to send a notification to a caller when a registry change occurs for the name (step 128).

Figure 1D:
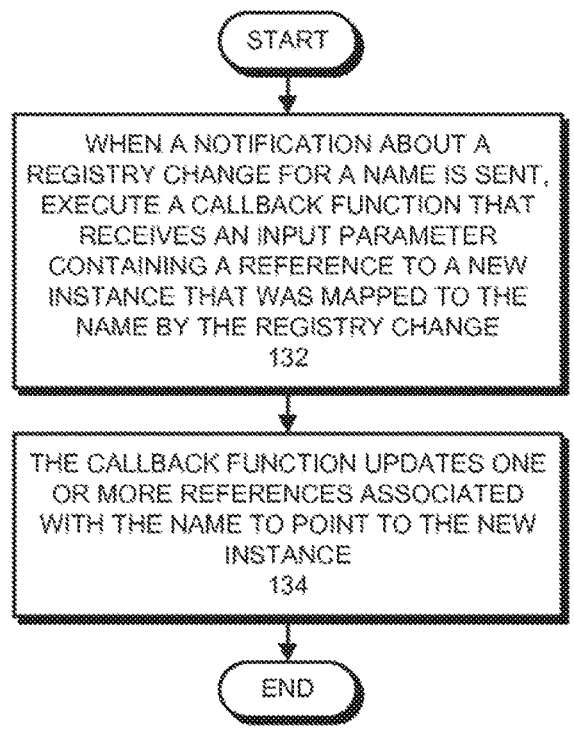
FIG. 1D presents a flow chart illustrating how a registry change for a name is handled by a callback function in accordance with the disclosed embodiments.

When a calling function, which previously made a call to be notified of registry changes for a name, subsequently receives a notification from the registry that the name has been remapped to a new instance, the calling function is configured to update one or more references associated with the name to point to the new instance. More specifically, referring to the flow chart illustrated in FIG. 1D, when a notification about a registry change for a name is sent, the system executes a callback function that receives an input parameter containing a reference to the a new instance that was mapped to the name by the registry change (step 132). Then, the callback function updates one or more references associated with the name to point to the new instance (step 134).

Additional details about implementations of the above-described system are discussed further below with reference to FIGS. 1E-18. In the following discussion, the term "application component" is also referred to as an "object" or a "feature," the term "name" is also referred to as a "dynamic identifier" or a "dynamic pointer," and the term "mapping" is also referred to as a "link."

System Details

In accordance with the teachings provided herein, systems and methods for using a central registry to facilitate app development and to manage and use dynamic pointers are provided. A developer creates a first feature (e.g., chart or table) that references a dynamic pointer. The pointer is defined as pointing to a second feature (e.g., a query that returns "a value" which can be responsive to or identifying user input). The reference can be created before defining the pointer or the converse. The reference and pointer definition are recorded in a central registry. The first feature is then bound to the pointer and second feature and registered to receive notifications of changes to the pointer and/or second feature. The first feature is dynamically updated based on a current value of the second feature. For example, a cell in a table can reflect a selected value of a query, or options in a first query can be determined based on a selected value for a second query. Thus, the developer need not repeatedly revise the first feature to accommodate each second-feature value.

In one feature, the pointer definition may subsequently change (e.g., to point to a third feature). The first feature will be notified of the change and its registrations will be adjusted appropriately. The first feature will automatically reflect the change. If multiple features reference the pointer, all features are automatically updated without requiring the developer to suffer through an error-prone approach of modifying each feature. In another feature, the developer may subsequently revise the first feature to reference another pointer. Registrations will again be appropriately adjusted.

At any given time, the central registry can be used to understand the relationships between features and pointers. For example, the registry can be used to identify, for a given feature, all other features bound to it. Intermediate binding pointers and binding directionality can further be identified. This information can be presented to a developer via text and/or graphics to facilitate environment understanding and debugging.

Binding changes (e.g., definitions of pointers or references to pointers) are tracked. All or part of the binding history can then be presented to the developer. For example, the history can presented using a visual timeline with markers representing binding changes and text associated with the markers providing details about the change. The developer can filter the history to focus on a particular time period or particular features. Thus, e.g., if the developer is aware of a problem that began during a time period and/or involving an feature, events so associated can suggest changes that led to the problem.

In some embodiments, a computer-implemented method is provided. The method includes receiving, at an app management system, first input that identifies a type of first app feature and that indicates that the first app feature is to depend on a dynamic pointer and updating a central registry to indicate that the first app feature depends on the dynamic pointer. The method also includes receiving, at the app management system, second input that indicates that the dynamic pointer is to be set to point to a second app feature and updating the central registry to indicate that the dynamic pointer points to the second app feature. The method further includes detecting an event indicating that the pointing of the dynamic pointer or that a value of the second app feature has changed and causing, in response to the event detection, a value of the first app feature to change.

In some embodiments, a system is provided that includes one or more data processors and a non-transitory computer readable storage medium containing instructions which when executed on the one or more data processors, cause the processor to perform operations including receiving, at an app management system, first input that identifies a type of first app feature and that indicates that the first app feature is to depend on a dynamic pointer. The operations further include updating a central registry to indicate that the first app feature depends on the dynamic pointer; and receiving, at the app management system, second input that indicates that the dynamic pointer is to be set to point to a second app feature. The operations also include updating the central registry to indicate that the dynamic pointer points to the second app feature, detecting an event indicating that the pointing of the dynamic pointer or that a value of the second app feature has changed, and causing, in response to the event detection, a value of the first app feature to change.

In some embodiments, a computer-program product is provided that is tangibly embodied in a non-transitory machine-readable storage medium that includes instructions configured to cause one or more data processors to receive, at an app management system, first input that identifies a type of first app feature and that indicates that the first app feature is to depend on a dynamic pointer. The instructions are further configured to cause the one or more data processors to update a central registry to indicate that the first app feature depends on the dynamic pointer; and receive, at the app management system, second input that indicates that the dynamic pointer is to be set to point to a second app feature. The instructions are further configured to cause the one or more data processors to update the central registry to indicate that the dynamic pointer points to the second app feature, detect an event indicating that the pointing of the dynamic pointer or that a value of the second app feature has changed, and cause, in response to the event detection, a value of the first app feature to change.

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1E:
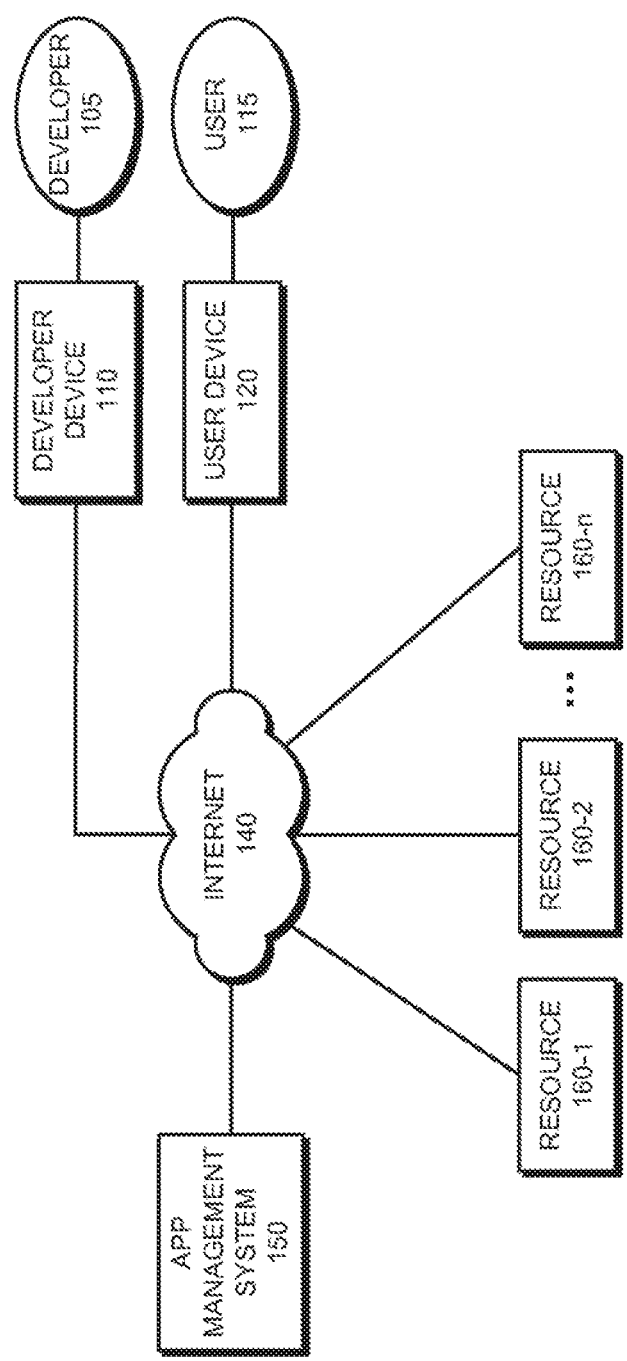
FIG. 1E illustrates a block diagram of an app provision interaction system in accordance with the disclosed embodiments.

Referring first to FIG. 1E, a block diagram of an embodiment of an app-provision interaction system 100 is shown. A developer 105 and/or user can interact with an app management system 150 via respective devices 110 and/or 120 and a network 140, such as the Internet, a wide area network (WAN), local area network (LAN) or other backbone. In some embodiments, app management system 150 is made available to one or more of developer 105 and/or user 115 via an app (that can be downloaded to and executed on a portable electronic device) or a website. It will be understood that, although only one developer 105 and user 115 are shown, system 100 can include multiple developers 105 and/or users 115.

Developer device 110 and/or user device 120 can each be a single electronic device, such as a hand-held electronic device (e.g., a smartphone). It will be understood that developer device 110 and/or user device 120 can also include a system that includes multiple devices and/or components. The device(s) 110 and/or 120 can comprise a computer, such as the desktop computer, a laptop computer or a tablet. In some instances, a party 105 and/or 115 uses different devices at different times to interact with app management system 150.

App management system 150 provides developer 105 with tools to facilitate development of an app. Developer 105 interacts with app management system 150 to define an operation and presentation of an app. As will be described in greater detail below, developer 105 can enter input that causes various app features to be defined.

App features include elements of an app that receive and/or present input to users 115. An app feature can be identified by its name and its value(s). The name can be textual or numeric and is used to distinguish the particular app features from other app features. To illustrate, names can include examples such as: Query1, Chart3, Satisfaction-Assessment, or Client1PerformanceChart. Most frequently, the name is substantially or completely fixed, such that it does not vary merely based on user input or developer modification to the app feature. An app feature's value(s) indicate the feature's content and/or operation capabilities. For example, developer 105 can enter text that is to be presented or presentable (e.g., and is presented subsequent to receiving user input) as part of the feature. In one instance, developer 105 defines a set of first values for the app feature which can be iteratively or simultaneously presented to a user 115, and user 115 can select amongst the first values (e.g., using a pull-down menu or radio buttons) to define a second value. As another example, a value is automatically calculated based on underlying data. For example, app management system 150 can continuously identify virtual-machine performance characteristics (e.g., a bandwidth, memory usage, response time, etc.). Each of a set of app features can further process and/or have a value set to a real-time characteristic.

Figure 2:
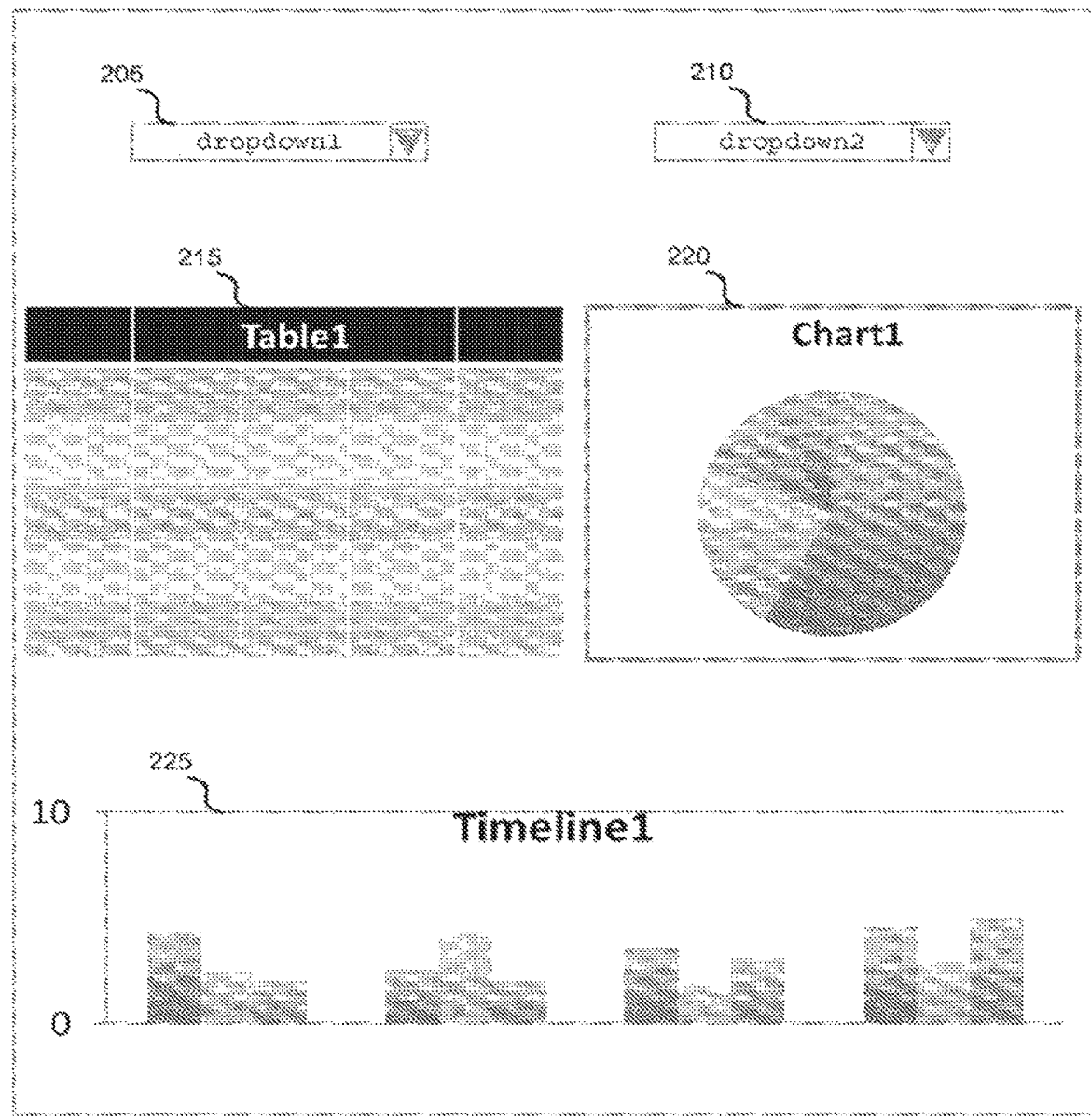
FIG. 2 illustrates exemplary representations of a variety of app features in accordance with the disclosed embodiments.

FIG. 2 illustrates example representations of a variety of app features. App features 205 and 210 are query features, where a value can be defined (e.g., via selection by a user 115). In this instance, query features 205 and 210 include drop-down menus presenting a list of initial values from which the user can select a value. In other instances, a query feature can include a list of radio buttons, an open text box, a format-restricted text box (e.g., only accepting numbers), etc. In various embodiments, a query value can be set or selected by a user 115 using an app or by a developer 105 defining the app. In one instance, the initial values shown in query feature 210 depend on a selected value from query feature 205.

App features 215 and 220 are table and chart queries, respectively. Table feature 215 includes 25 cells, each of which can have a value therein. Chart feature 220 includes a pie graph, with four portions contributing to the whole. The values and/or portions can be again defined by a user and/or developer, or they can reflect values from another app feature (e.g., a cell value in table feature 215 can be set to a value selected in a query feature, or values contributing to a chart in chart feature 220 can be defined based on cell values in a table feature 215). App feature 225 is a timeline feature, that shows historical values. For example, one set of bars may reflect, for various time points, which value was selected using a query feature or a performance characteristic.

Ultimately, using input from developer 105 and capabilities of app management system 150, an app code is generated or updated and stored. This code can reference and/or define app features to be used in the app's operation. App management system 150 then executes the code such that the corresponding app can be presented to and used by users 115. During the app's execution, app management system 150 calls on and utilizes one or more resources 160 which can be remote from or co-located with app management system 150.

It will be appreciated that, while FIG. 1E shows app management system 150 as being separate from resources 160, in some embodiments, parts of system 150 are present on one or more resources 160. For example, databases or data summarizers can be present on resources 160.

Figure 3:
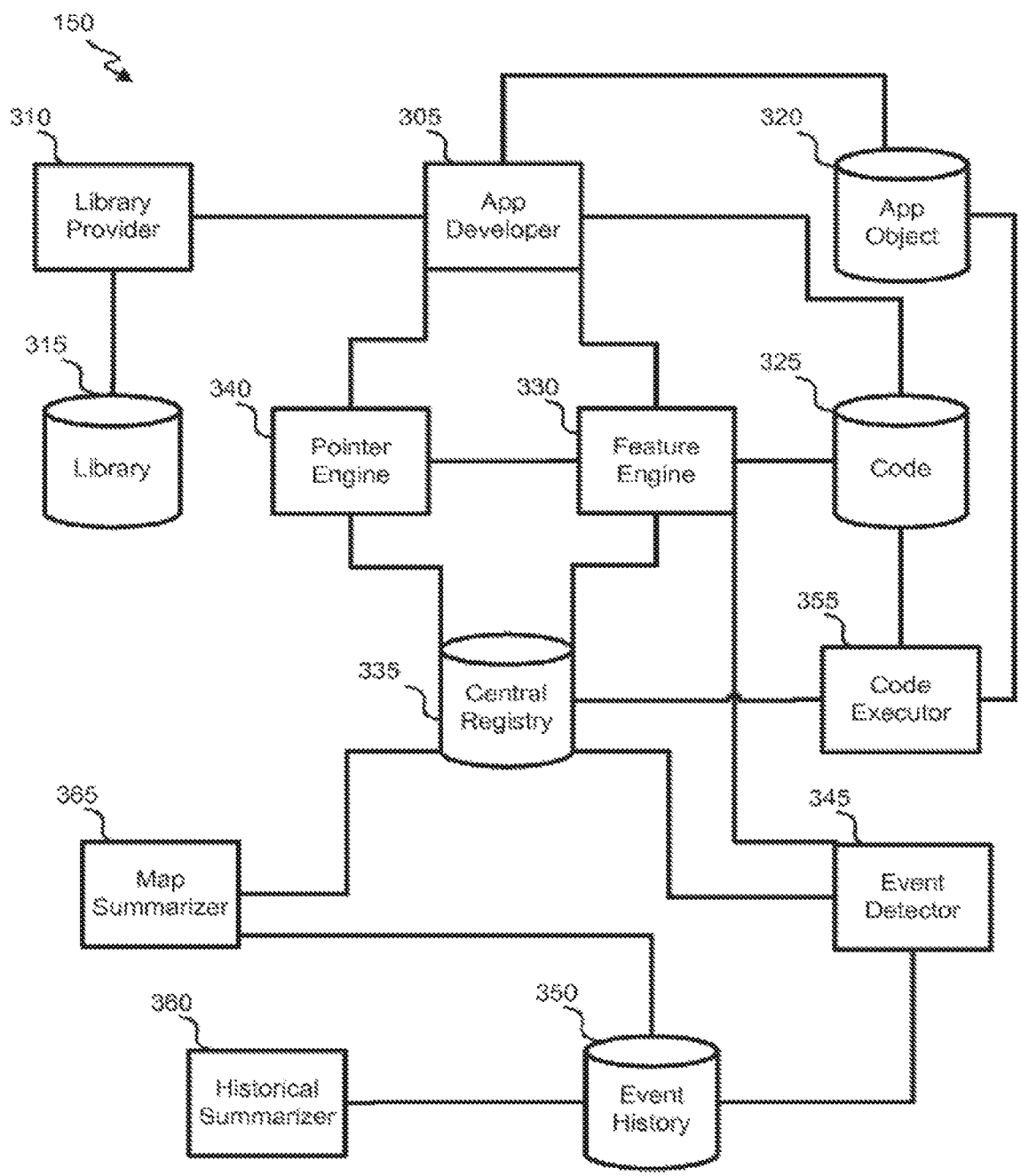
FIG. 3 illustrates a block diagram of an app management system in accordance with the disclosed embodiments.

Referring next to FIG. 3, a block diagram of an embodiment of app management system 150 is shown. App management system 150 can be, in part or in its entirety, in a cloud. In some instances, at least part of app management system 150 is present on a device, such as a developer device 110. In some instances, various components in app management system 150 are present in a set of resource. For example, library database 315 can be stored on resource 160-1, code database 325 can be stored on resource 160-2, and central registry 335 can be stored on resource 160-3. Thus, app management system 150 can include a distributed system.

App management system 150 includes an app developer 305 that interacts with a developer 105 to facilitate development of an app. Initially, app developer 305 requests one or more libraries from library provider 310. Library provider 310 can use default a library selection (e.g., always providing a same library) or can base the selection based on characteristics of developer 105 and/or indications as to what type of app developer 105 wishes to develop. For example, developer's input and/or account data can identify a subscription type or level, a programming-skill level, an industry, a foreseen user-involvement level, and/or an authorization. Based on this data, one or more libraries can be appropriately selected. In one instance, library provider 310 and app developer 305 can coordinate to present a list of available libraries (potentially with associated costs) to developer 105, and he can then select which libraries will be provided.

Library provider 310 can then collect the appropriate library (or libraries) from library database 315. The library can include routines, subroutines, classes, modules and/or functions which can be stored in object format. It will be appreciated that disclosures that refer to "subroutines" herein can be extended to embodiments instead pertaining to routines, classes, modules, functions, etc. A library can include subroutines that pertain to app features and/or dynamic pointers. For example, a routine can register an app feature (e.g., by registering its name), determine whether an app feature exists, define an app feature or revoke an app feature.

The library can be made accessible to a developer 105 (via app developer 305). In one instance, a link can be provided, where selection of the link causes the library to be downloaded to a developer device 110. In one instance, the library is downloaded to a resource 160. Further, library provider 310 can provide instructions and/or examples to illustrate how aspects of the library (e.g., specific subroutines) can be used. In one instance, providing a library includes presenting names of available subroutines.

Developer 105 can upload or otherwise define app objects (e.g., graphics, videos, animations, etc.), which app developer 305 can store in an app-object database 320. Further, app developer 305 can facilitate the generation of a code (e.g., based on input from developer 105) that defines an app. The code can be stored in a code database 325. In one instance, a developer 105 uploads or enters code that loads a library and calls one or more subroutines from the library.

Developer 105 can interact with app developer 305 and utilize library subroutines to register and/or create an app feature. Initially, developer 105 can define a name of the app feature (e.g., while calling a feature-generation or feature-registration subroutine). A feature engine 330 can detect the instantiation (e.g., by detecting the call to the appropriate subroutine) and register the new app feature in a central registry 335. This registration can include identifying, e.g., the app feature's name, an app or code calling the registration subroutine, the developer responsible for the registration, an indication as to whether the app feature is empty or includes data (e.g., the feature being empty until it is otherwise defined), and/or an indication as to whether the app feature calls or references any dynamic pointers. It will be appreciated that while names (of features and/or of dynamic pointers) will typically include alphanumeric text, other identifiers can be used (e.g., numbers). Registration can include adding the identifying information to a list, column, row or matrix in central registry 335. The registration can further include assigning a unique identifier (e.g., a number, alphanumeric code or index) to the app feature.

Feature engine 330 can further detect feature-defining actions. For example, feature engine can detect use of a feature-defining subroutine or other triggering input. Creation of certain object types (e.g., using traditional coding language or subroutine calls) can cause the created object to be automatically registered. For example, creation of a menu, list, matrix, query, table and/or chart can automatically cause the object to be registered. In these instances, feature engine 330 can simultaneously detect the feature instantiation and that the feature is defined. Upon detecting that a feature is defined, feature engine 330 can update central registry 335 to reflect the definition. For example, a status of the app feature can be changed from empty to present. As another example, a location (e.g., code name and, potentially, a line number) of the feature's definition can be recorded in central registry.

Feature engine 330 can detect other feature-related actions. For example, feature engine 330 can detect a command or other action indicating that an app feature is to be removed from central registry 335 (e.g., a revoke command), and feature engine can then remove the app feature (e.g., its name, any associated binding and/or other information) from registry 335. As another example, feature engine 330 can detect a command or input requesting information about registered app features in central registry 335. The request can include a request for, e.g.: a list of registered app features, confirmation as to whether a particular app feature is registered, a status of an app feature (empty or present), whether an app feature is bound to another app feature or references a pointer (described in further detail below), etc. Feature engine 330 can search central registry 335 to determine a response to the request and relay the result to developer 105 via app developer 305.

A pointer engine 340 can add dynamic pointers to central registry 335. Code or input can be used to explicitly initialize and/or define a dynamic pointer. For example, a code can initialize a pointer variable, or a developer can interact with a graphical user interface to request a pointer generation.

Pointer engine 340 can detect such code or input and can then add the pointer to central registry 335. Adding the pointer can include adding a name of the pointer and/or adding a value of the pointer to a list, column, row or matrix in central registry 335. The list, column, row or matrix can be within a same structure as one that identifies an app feature or corresponds to a similar list, column, row or matrix that identifies an app feature. Alternatively, they can be independent and non-corresponding (e.g., with regard to listing order). The value of the pointer can identify another app feature or it can be set to empty if no other app feature has yet be identified. In some instances, pointer engine 340 only adds the pointer to central registry 335 after confirming that registry 335 does not already include the pointer (e.g., by searching for the pointer's name).

Pointer engine 340 can also or alternatively detect less explicit pointer-defining code or input. For example, code for an app feature can forego defining or registering a dynamic pointer but nonetheless reference (or call) a dynamic pointer. Such reference can indicate that at least part of the first app feature's value is to depend on a value of another app feature pointed to by the dynamic pointer. This detection can be aided in instances in which dynamic pointers are to have a particular format. Upon detecting the attempted utilization of the dynamic pointer, pointer engine 340 can add the dynamic pointer (e.g., by adding its identified name) to central registry 335.

Thus, a dynamic pointer can be registered to central registry 335 before it is defined. That is, pointer engine 340 detects a new pointer and its name, but the pointer is not set to or pointing to any other object. Pointer engine 340 can then monitor code and/or input for a subsequent definition. Even once a pointer is defined, pointer engine 340 can continue to monitor code and/or input such that it can detect any changes or overrides to the pointer's definition.

Typically, a pointer's definition will include an identification of an app feature. The pointer's definition can further identify a particular field or variable within the app feature. The pointer's definition can be realized based on, e.g., a code (a code for a feature that calls the dynamic pointer or another code) or input received from a developer 105 via a graphical user interface.

Upon detecting the definition, pointer engine 340 can update central registry 335 to reflect the definition. For example, central registry 335 can have an entry for a pointer, and the entry can be updated to include an identifier of an app feature (e.g., its name, entry index, unique identifier, etc.).

The pointer can be defined to point to an app feature that is not registered with central registry 335. In these cases, pointer engine 340 can prompt feature engine 330 to register an appropriate empty app feature to central registry 335.

It will be appreciated that the order of the pointer registration, pointer definition, app feature registration and app feature definition is malleable. That is, in some embodiments, it is acceptable to both define an app feature that calls a dynamic pointer before defining the dynamic pointer and to define the dynamic pointer before defining the app feature that calls the dynamic pointer. Similarly, in some embodiments, it is acceptable to both define a dynamic pointer that points to an app feature before defining the app feature and the converse. Thus, feature engine 330 can regularly or continuously monitor (e.g., monitor code or interface interactions) to detect new or changed references to pointers in app features.

Feature engine 330 can further coordinate binding between elements in central registry 335. Specifically, an app feature can be directly bound to a dynamic pointer and/or indirectly bound to another app feature. Feature engine 330 can directly bind the app feature to the dynamic pointer after detecting that the app feature calls, references or otherwise depends on the dynamic pointer. Feature engine 330 can indirectly bind the app feature to the other app feature upon detecting that the app feature is directly bound to a dynamic pointer and the dynamic pointer is set to a value of the second app feature.

Binding can include links or connections between central registry entries (e.g., feature entries and/or pointer entries) or a portion of the entries that identify a bound object. For example, a binding link can include a vector, with a first element that identifies a referring app feature and a second element that identifies a dynamic pointer. As another example, a portion of an app feature entry can indicate that it is directly bound to a "myquery" dynamic pointer and indirectly bound to a "query1" app feature, or a portion of "query1" can indicate that "feature1" is to be notified of changes involving the query.

Bindings can be direction, such that a binding points in a direction of greater independence. That is, if a first app feature references a dynamic pointer which is set to a second app feature, bindings between the first app feature and the dynamic pointer and second app feature will point away from the first app feature.

Figure 4A:
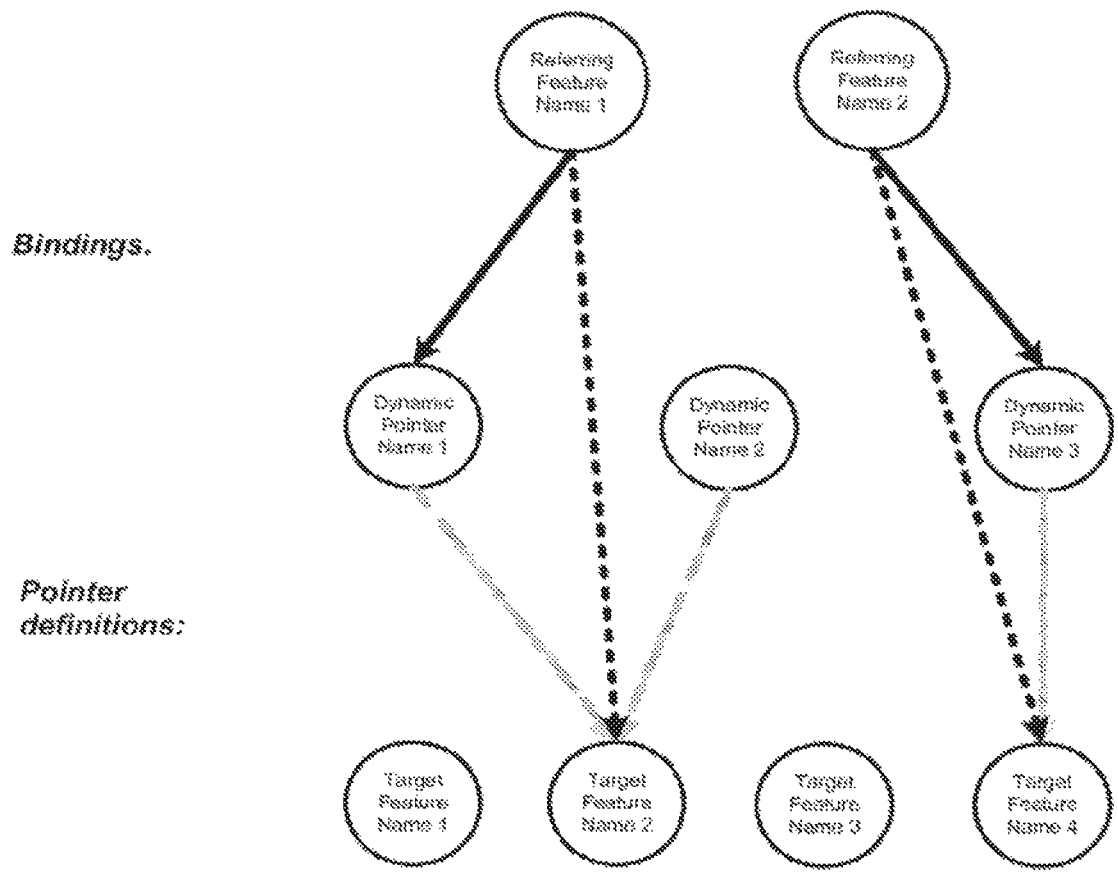
FIGS. 4A-4B illustrate examples of snapshots of dynamic maps between app features and pointers to reflect current dependencies in accordance with the disclosed embodiments.
Figure 4B:
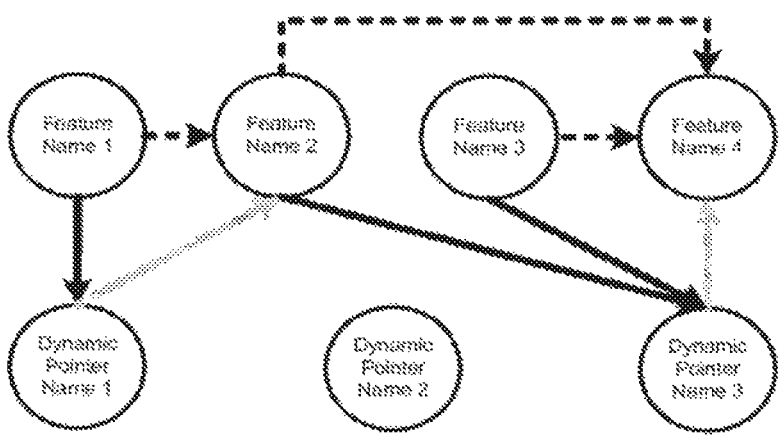

FIGS. 4A and 4B illustrate bindings between registry elements. Each circle represents a registry entry for an app feature or dynamic pointer, and each black line represents a binding. In FIG. 4A, two app features represented in a top row reference or call a dynamic pointer. Thus, they are directly bound to the respective pointers Pointer definitions are represented by the gray lines. Each pointer is set to a particular app feature. Indirect bindings (show as dashed lines) are generated between app features that are connected via pointers.

In FIG. 4A, referring and target features are shown independently. In some instances, there is no such explicit separation from these features. Rather, features can be generally registered with central registry 335 and can serve as a referring feature, a target feature or both. For example, in FIG. 4B, Feature 2 serves as both a referring feature (referencing Pointer 3) and a target feature (with Pointer 1 being set to Feature 2). FIG. 4B further illustrates that a pointer (e.g., Pointer 2) can be included in the registry despite not being defined.

Once a referring feature is bound to a pointer or target feature, an event detector 345 registers the feature to receive notifications of registry events pertaining to the pointer or target feature. This registration allows the referring feature to "listen" to events pertaining to the pointer or target feature. Event detector 345 monitors central registry 335 to detect any registry events. Events can include, e.g., a new pointer registration, a new app feature registration, a new pointer definition, a new app feature definition, a change to a pointer's definition, a change to an app feature's definition, a removal of a pointer, or a removal of an app feature. Event detector 345 can detect the time of the event, an identifier of the involved pointer or app feature, and/or a type of the event (e.g., registration, definition, change, or revocation). Event detector 345 can store the detected information in an event-history database 350.

Event detector 345 can further determine which app features are registered to receive notification of the detected event (e.g., are listening for events involving the event-pertaining feature or pointer). For example, event detector 345 can search a set of binding link vectors or app-feature elements for any that include an identifier of the event-pertaining feature or pointer. Event detector can then notify feature engine 330 of the event and the app features listening for the event. Feature engine 330 can update code for the listening features based on the event. In some instances, the feature code need not be updated but the app feature will automatically be updated in response to the event.

A code executor 355 (which can include a compiler) can (in response to a request from a user or develop or periodically) execute the code. The code can include codes for features, which can reference dynamic pointers. Code executor 355 can access central registry to determine a current value for the pointers. The pointer values can then be seamlessly integrated into the features.

App management system 150 includes two summarizers that can aid a developer 105 in understanding the state(s) and operation(s) of an app. A historical summarizer 360 accesses the event-history database 350 and collects a series of events. Historical summarizer 360 can filter the events and/or restrict the collection based on, e.g., a time period of interest, app-feature types of interest, a developer of interest and/or a type of event of interest. Historical summarizer 360 can sort or otherwise arrange the events, e.g., based on one or more of these same properties. The properties can be defined by a developer (e.g., as a preference or in a recent historical-summary request) or by system 150 (e.g., based on default properties or based on characteristics of developer 150 or registry 335).

Historical summarizer 360 can generate a time line. Each event is assigned a position along an axis corresponding to a time of the event. A symbol (e.g., tick mark, circle, x, dashed line, etc.) can be presented at the position, along with other indications characterizing the event. For example, text or colors can indicate the type of event that occurred, the involved features and/or pointers and/or a developer who initiated the event. Event times may or may not be explicitly or implicitly identified. For example, each event can be accompanied by text noting the event time, or extremes of a timeline can include time identifiers with event times being indicated by their position along the timeline.

Figure 5:
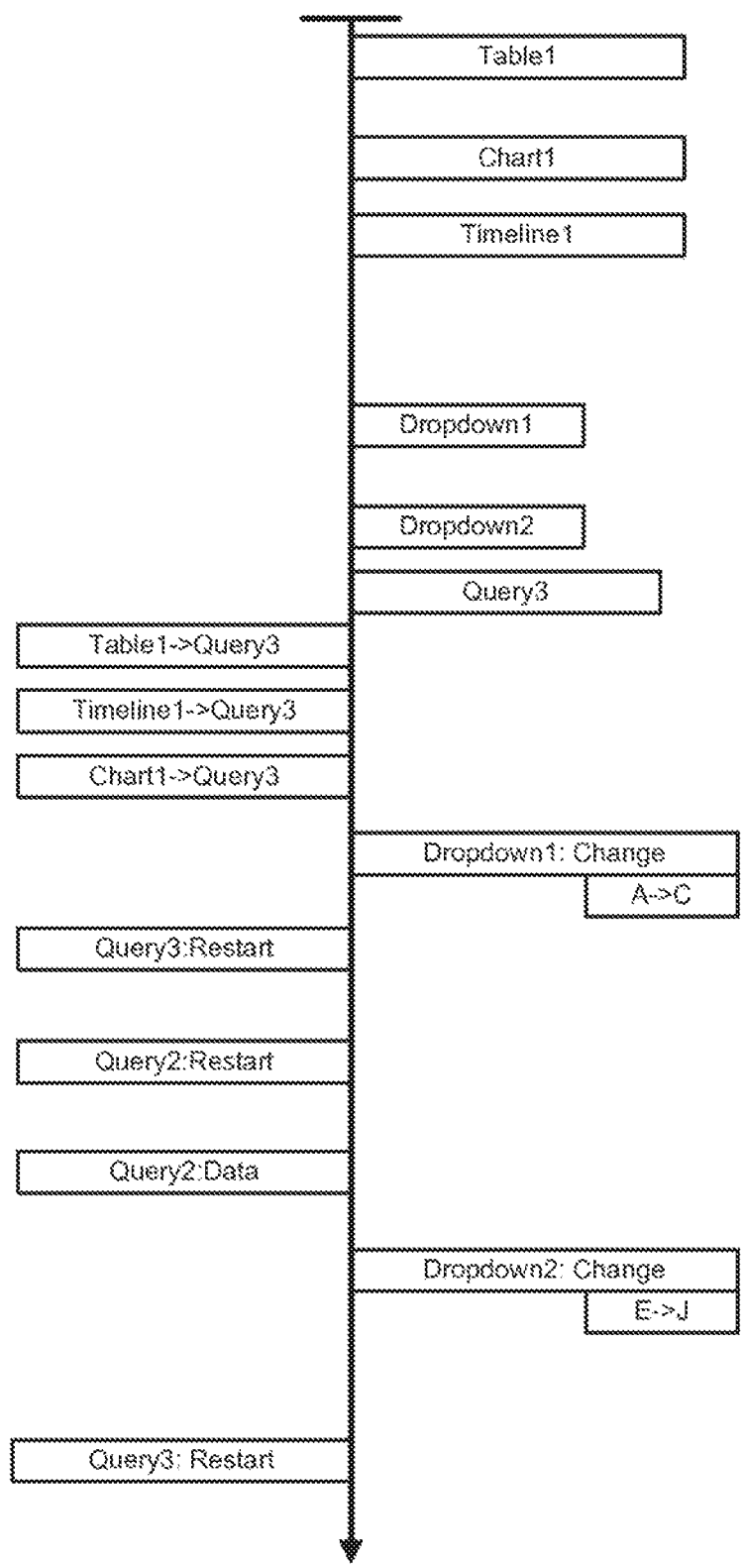
FIG. 5 illustrates an example representation identifying a history of events pertaining to a map of interrelated features and dynamic pointers in accordance with the disclosed embodiments.

FIG. 5 illustrates an example representation identifying a history of events pertaining to app features and dynamic pointers. Each vertical block represents an event. Its horizontal location along the timeline represents a time of the event. Text in the block characterizes the event. Blocks with a single app feature name indicate that the app feature was created. The blocks with arrows indicate that an indirect binding was generated between the app feature listed before the arrow to the app feature listed after the arrow. The blocks with colons indicate that a value for the app feature listed before the colon was set to that identified after the colon. This particular illustration does not directly represent the involvement of pointers but instead focuses on the resulting indirect binding facilitated by the pointers. However, such events could be included in the timeline in other embodiments.

Historical summarizer 360 can present the historical summary to a developer 105 via an interface or send the summary to developer 105 via email. Developer 105 can interact with the summary and adjust filtering in substantially real-time (e.g., causing the presented summary to be quickly and smoothly readjusted). For example, developer 105 can zoom into or out of a time period.

Developer 105 can interact with the summary to delete event representations. Such an action can serve to merely reduce the presented data or can take effect to actually reverse the particular event (e.g., a pointer definition change, app feature registration, etc.).

The timeline illustrated in FIG. 5 includes blocks representing events associated with the registry that are organized in chronological order from top to bottom. The top of the timeline includes blocks representing calls to create entries for component instances, including "Table1," "Chard," "Timeline1," "Dropdown1," "Dropdown2" and "Query3."

Below these blocks, the timeline includes blocks representing calls to be notified about changes to registry entries, including: "Table1→Query3" indicating the component instance associated with Table1 is making a call to be notified about changes to the registry entry for Query3; "Timeline1→Query3" indicating the component instance associated with Timeline1 is making a call to be notified about changes to the registry entry for Query3; and "Chart1→Query3" indicating the component instance associated with Chart1 is making a call to be notified about changes to the registry entry for Query3.

Next, the timeline includes an event labeled "Dropdown1: Change" indicating the value selected by Dropdown1 has been changed from "A" to "C." This change causes Query3 and Query2 to be notified, which triggers Query3 and Query2 to be restarted, and this causes new data to be returned by Query2. This sequence of operations is represented by the blocks "Query3: Restart," "Query2: Restart," and "Query2: Data."

Suppose data returned by Query2 causes the set of possible selections for Dropdown2 to change. This enables a user to select another value from Dropdown2, for example to change the selection for Dropdown2 from "E" to "J." To represent this change, the timeline includes an event "Dropdown2: Change" indicating the value selected by Dropdown2 has been changed from "E" to "J." This causes Query3 be notified and triggers Query3 to be restarted as is represented by the block "Query3: Restart."

A map summarizer 365 can construct a map that identifies interrelationships between app features and/or pointers. Map summarizer 365 can identify a set of unique features in central registry 335. The unique features can be unique features amongst all features in registry 335 or amongst some of the features in registry 335 (e.g., those pertaining to a particular app or developer). Map summarizer 365 can then search bindings to determine which features are bound (e.g., indirectly bound) together and the directionality of the binding. For each feature, map summarizer 365 can also record its type and/or its value.

Map summarizer 365 can further similarly identify a set of unique dynamic pointers or those dynamic pointers facilitating indirect binders. Any involvement of these dynamic pointers in indirect binding can be determined based on direct bindings between a referring app feature and a pointer and the pointer definition.

Map summarizer 365 can then generate a high-level map that identifies the interconnectivity between app features (and potentially between app features and dynamic pointers). The map is high-level in that it does not concentrate on a single binding but instead indicates a set or all of the bindings involving an app feature. Thus, e.g., if a particular app feature referenced three pointers that were defined based on values from the other app features, the map would identify all three resulting indirect bindings.

Map summarizer 365 can then generate and present a map (e.g., including text, a chart or a graphic) that indicates the feature (and potentially pointer) relationships. Information can accompany the map to, e.g., identify, for one, more or each feature, its type and/or value. In some instances, bindings are represented using lines or arrows (with the arrow's direction representing a dependency direction).

Figure 6:
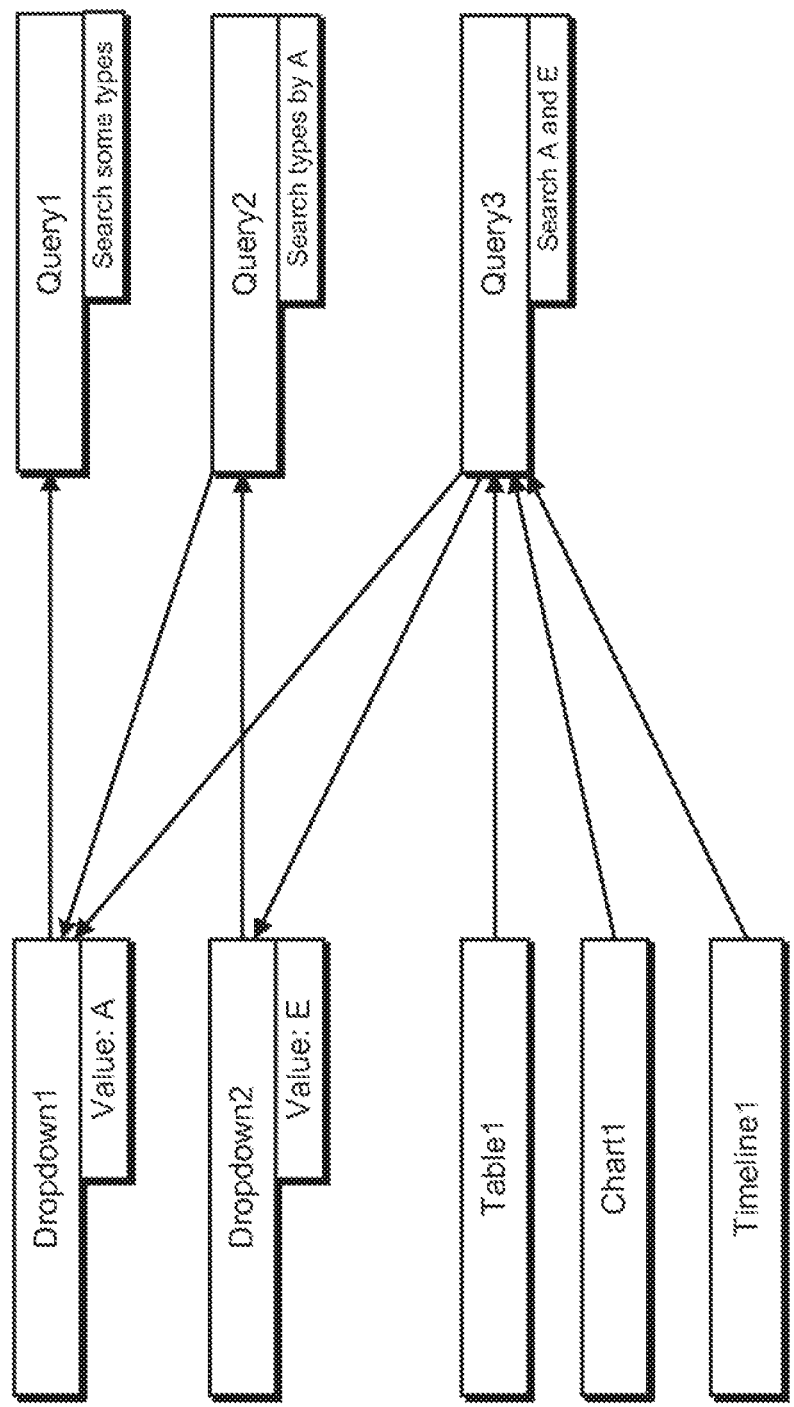
FIG. 6 illustrates an example representation identifying interrelationships between app features in accordance with the disclosed embodiments.

FIG. 6 illustrates an example presentation of a map identifying interrelationships between features. Once again, the tail of each arrow is at an app feature that depends on the feature at the head of the feature. Thus, for example, Query2 is set to search for data of type "A" since the value of Dropdown1 is "A". Similarly, Query3 is set to search for data of types "A" and "E" due to the values of Dropdown1 and DropDown2. Dropdown1 and Dropdown2 have options that are selected based on the results to Query1 and Query2, respectively. Table1, Chart1 and Timeline1 can include elements that reflect the result of Query3. This presentation can allow a developer 105 to determine an impact of a particular app feature (e.g., whether it is being used at all) and identify all app features with a dynamic element due to the indirect binding.

More specifically, FIG. 6 includes nodes illustrated as rectangular blocks representing a number of component instances, including: dropdown menus "Dropdown1" and "Dropdown2"; "Table1"; "Chart1"; "Timeline1"; and queries "Query1," "Query2" and "Query3."

FIG. 6 also includes arrows representing "notification dependencies" between component instances that indicate component instances that will be notified when a registry entry changes. More specifically, an arrow between a first node representing a first component instance and a second node representing a second component instance indicates that when a registry entry associated with the second component instance changes, the first component instance will be notified.

FIG. 6 includes a number of arrows pointing to Query1 and Query2. More specifically, an arrow from Dropdown1 to Query 1 indicates that Dropdown1 will be notified when a value returned by Query1 changes. This is can be done through the use of token variables. (For example, a special "token entry" can be created in the registry that maps a token name to an associated variable containing a token value, wherein the token value is received as a result from Query1. A notification dependency can then be created between Dropdown1 and this token entry, so that Dropdown1 is notified whenever Query1 returns a different result.) Suppose that when Query1 returns a set of results A, B and C, the results are communicated to Dropdown1, and then Dropdown1 allows a user to select between results A, B and C. In this case, if Query1 produces different results, the contents of Dropdown1 need to change to reflect these different results, so Dropdown1 needs to be notified when Query1 changes. Similarly, an arrow from Dropdown2 to Query 2 indicates that Dropdown2 needs to be notified when a value returned by Query2 changes.

FIG. 6 also includes arrows that point to Dropdown1 and Dropdown 2. More specifically, an arrow from Query2 to Dropdown1 indicates that Query2 will be notified when a value selected through Dropdown1 changes. This is can be done through the use of token variables as is described above. Suppose Query2 receives an input value from Dropdown1 that is used to perform the query. In this case, if Dropdown1 selects a different value, Query2 may need to be re-run using this different value. This can be facilitated by including a token entry in the registry to ensure that Query2 will be notified when an associated value selected through Dropdown1 changes. Also, an arrow from Query3 to Dropdown1 indicates that Query3 will be notified when a value selected through by Dropdown1 changes, and an arrow from Query3 to Dropdown2 indicates that Query3 will also be notified when with a value selected through Dropdown2 changes.

FIG. 6 also includes arrows that point to Query3. More specifically, an arrow from Table1 to Query3 indicates that Table1 will be notified when the value returned by Query3 changes. Suppose a value returned by Query3 is displayed in Table1. In this case, if the value returned by Query3 changes, Table1 will need to be updated to display this changed value. This can be facilitated by including a token entry in the registry to ensure that Table1 will be notified when a value returned by Query3 changes. Similarly, an arrow from Chart1 to Query3 indicates that Chart1 will be notified when a value returned by Query3 changes, and an arrow from Timeline1 to Query3 indicates that Timeline1 will be notified when a value returned by Query3 changes.

Map summarizer 365 can receive input from a developer that influences its map generation and/or presentation. For example, a developer 105 can identify a time point (e.g., by entering a date or by sliding a marker along a time bar). Based on the current bindings and definitions recorded in central registry 335 and based on the event history in database 350, map summarizer can derive a map with bindings existing at the time point. In another instance, past registry data can itself be stored. As another example, a developer 105 can identify one or more particular app features of interest (e.g., one(s) not appearing as intended), and map summarizer 365 can generate a restricted map including all bindings involving the particular app feature(s). A default setting or input from developer 105 can identify a level of relationship to present. For example, the developer may wish to view all features separated from a feature of interest by no more than one, two or n dynamic pointers.

The presented map can be static or interactive. In the latter instance, a developer 105 may be able to move binding representations and/or add or delete feature or pointer representations. Map summarizer 365 may then appropriately adjust central registry 335 in accordance with the actions.

Figure 7:
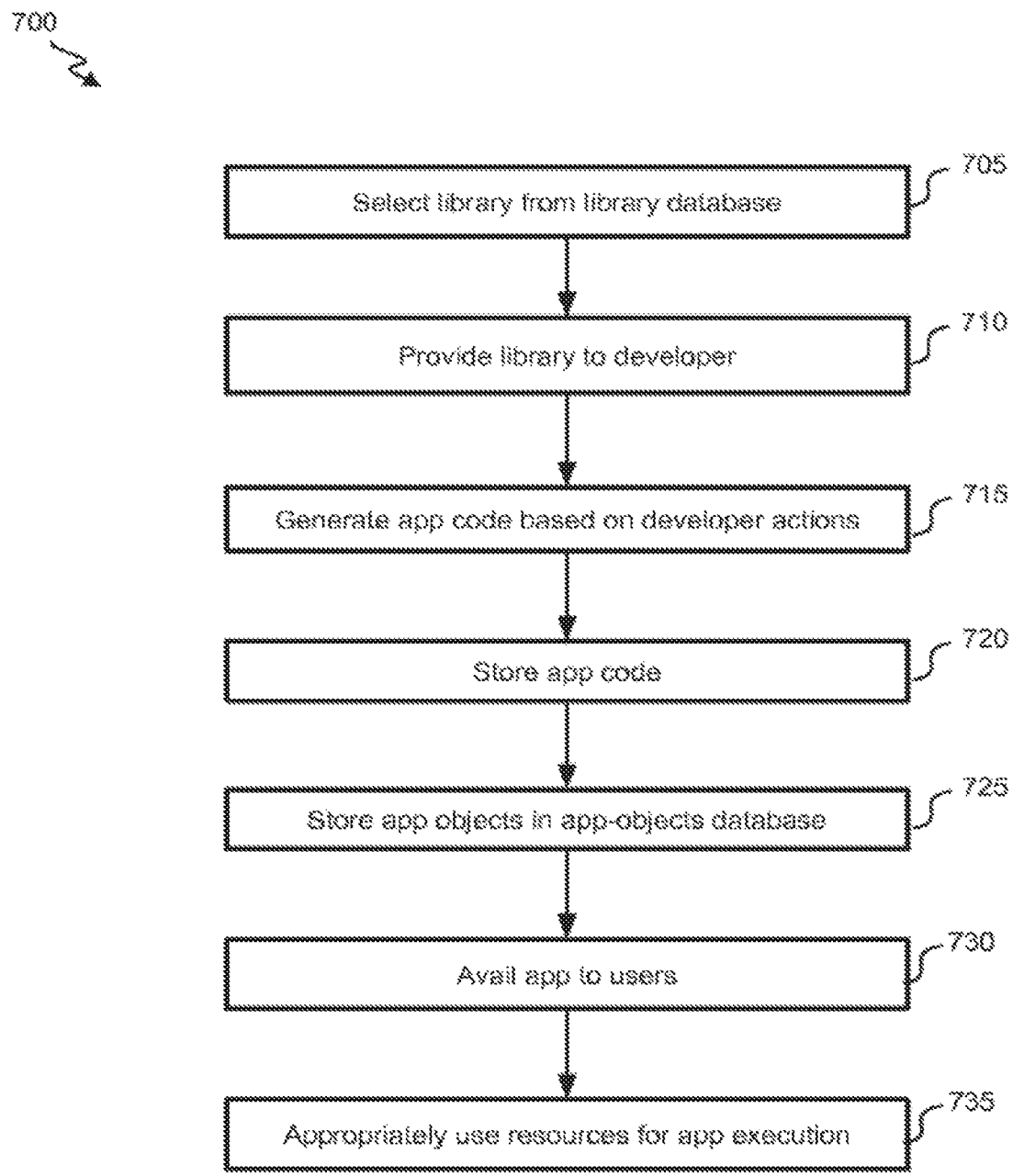
FIG. 7 illustrates a flowchart of an embodiment of a process for facilitating app development in accordance with the disclosed embodiments.

FIG. 7 illustrates a flowchart of an embodiment of a process 700 for facilitating app development. Process 700 begins at block 705, where library provider 310 selects a library from library database 315. The library can be selected based on characteristics of a developer using app management system 105, input from the developer identifying a type of app that he wishes to develop, and/or default library selections. The library can include subroutines that enable the developer to utilize dynamic pointers and app features calling dynamic pointers. Library provider 310 provides the library to developer 105 at block 710. The provision can include an action that enables developer 105 to utilize the functionality and/or subroutines of the library.

App developer 305 generates code thereby developing an app based on developer actions at block 715. This development may include merely receiving code entered by developer 105. App developer 305 may or may not further modify the received code. The development may include converting developer interactions with a graphical user interface to code. The code can include reference to a dynamic pointer, definition of an app feature and/or definition of a dynamic pointer. App developer 305 stores the code in code database 325 at block 720. The code can be associated with developer 105 and/or an app name in database 325.

App developer 305 stores one or more app objects in app-objects database 320 at block 725. These app objects can include ones uploaded by developer 105 or defined by developer 105 during interactions with a coding module or graphical user interface of app management system 150. The app objects can include ones referenced by the stored app code.

Code executor 355 avails app to users 115 at block 730. For example, code executor 355 can provide a link (with hyperlinked text or icon) that will initiate app execution. As another example, code executor 355 can add an identifier of the app to a database or store, such that users have the ability to purchase and/or download it.

Code executor 355 appropriately utilizes resources and executes the app at block 735. The app may be executed in a cloud and/or on a user device 120. Definitions of dynamic pointers, references to dynamic pointers and/or bindings between app features and dynamic points and/or other app features may be substantially or entirely fixed once a user begins to use the app. Alternatively, cloud-based communications can continue to modify such aspects after receiving developer instruction to do so.

Figure 8:
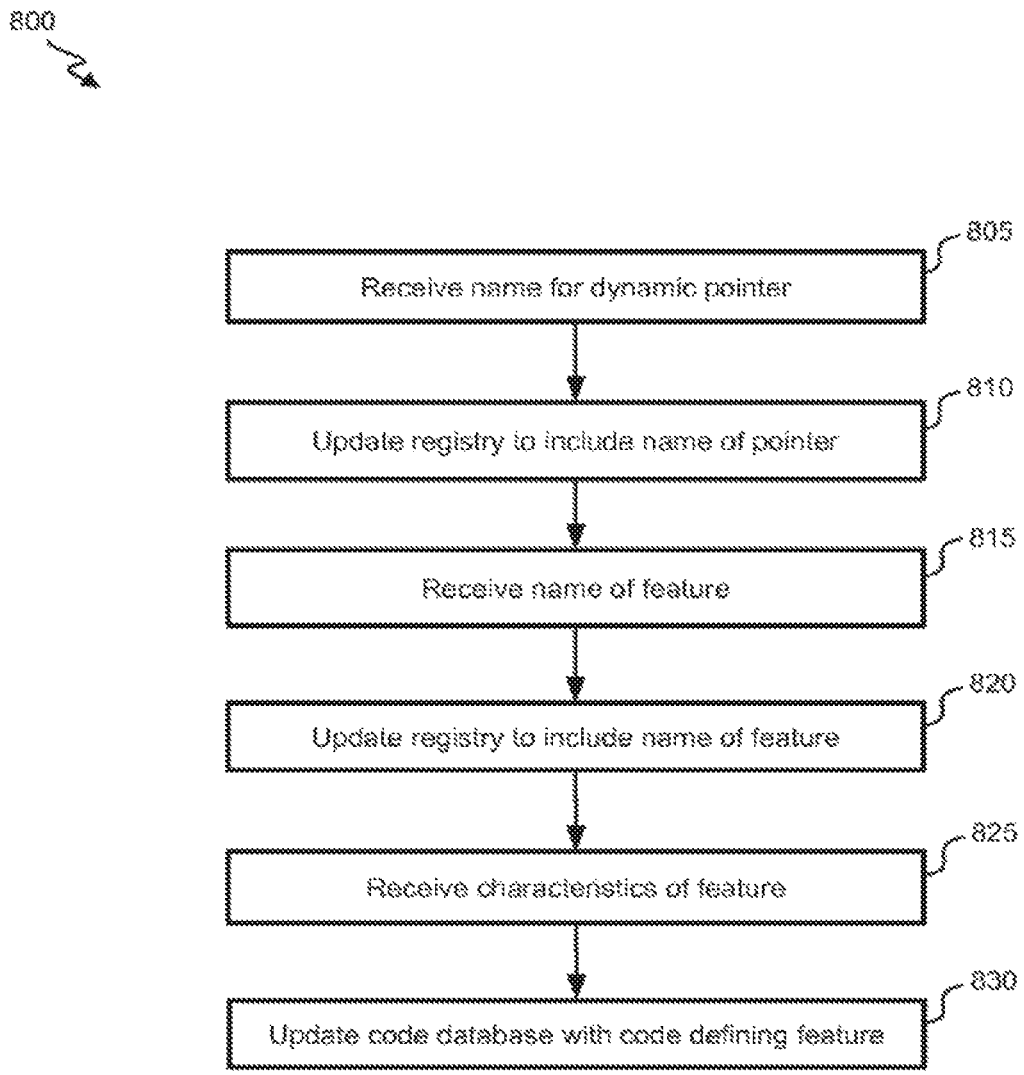
FIG. 8 illustrates a flowchart of an embodiment of a process for tracking feature and pointer dependencies in a central registry in accordance with the disclosed embodiments.

FIG. 8 illustrates a flowchart of an embodiment of a process 800 for tracking feature and pointer dependencies in a central registry. Process 800 begins at block 805, where pointer engine 340 receives, via app developer 305, a name for dynamic pointer from developer 105. The name can be received as part of an explicit attempt to define or register the dynamic pointer or based on a first reference to the pointer in a code (e.g., a code defining an app feature). Pointer engine 340 updates central registry 335 to include the name of the dynamic pointer at block 810. Pointer engine 340 may first confirm that the name of the dynamic pointer was not previously added to registry 335. If the dynamic pointer has not yet been defined or set to point to an app feature, its value can be empty. Otherwise, its value can be set to include a name of an appropriate app feature.

Feature engine 330 receives a name of a feature at block 815. Developer 105 can identify the name, or it can be automatically assigned upon detecting that a new app feature is being defined. Feature engine 330 updates central registry to include the name of the new app feature. Feature engine 330 may first confirm that the name of the app feature was not previously added to registry 335.

Feature engine 330 receives characteristics of the app feature at block 825. In some instances, a characteristic indicates that a presentation and/or operation of the app feature is to depend on another app feature (e.g., via a dynamic pointer). The characteristics can be directly identified by developer 105 (e.g., by selecting options or utilizing GUI buttons) or identified as part of a code for the feature. Feature engine 330 can generate or update a code to define the feature such that it includes the characteristics. This code can be separate from or part of an overall code defining an app. Feature engine 330 updates code database 325 to include the code at block 830.

Figure 9:
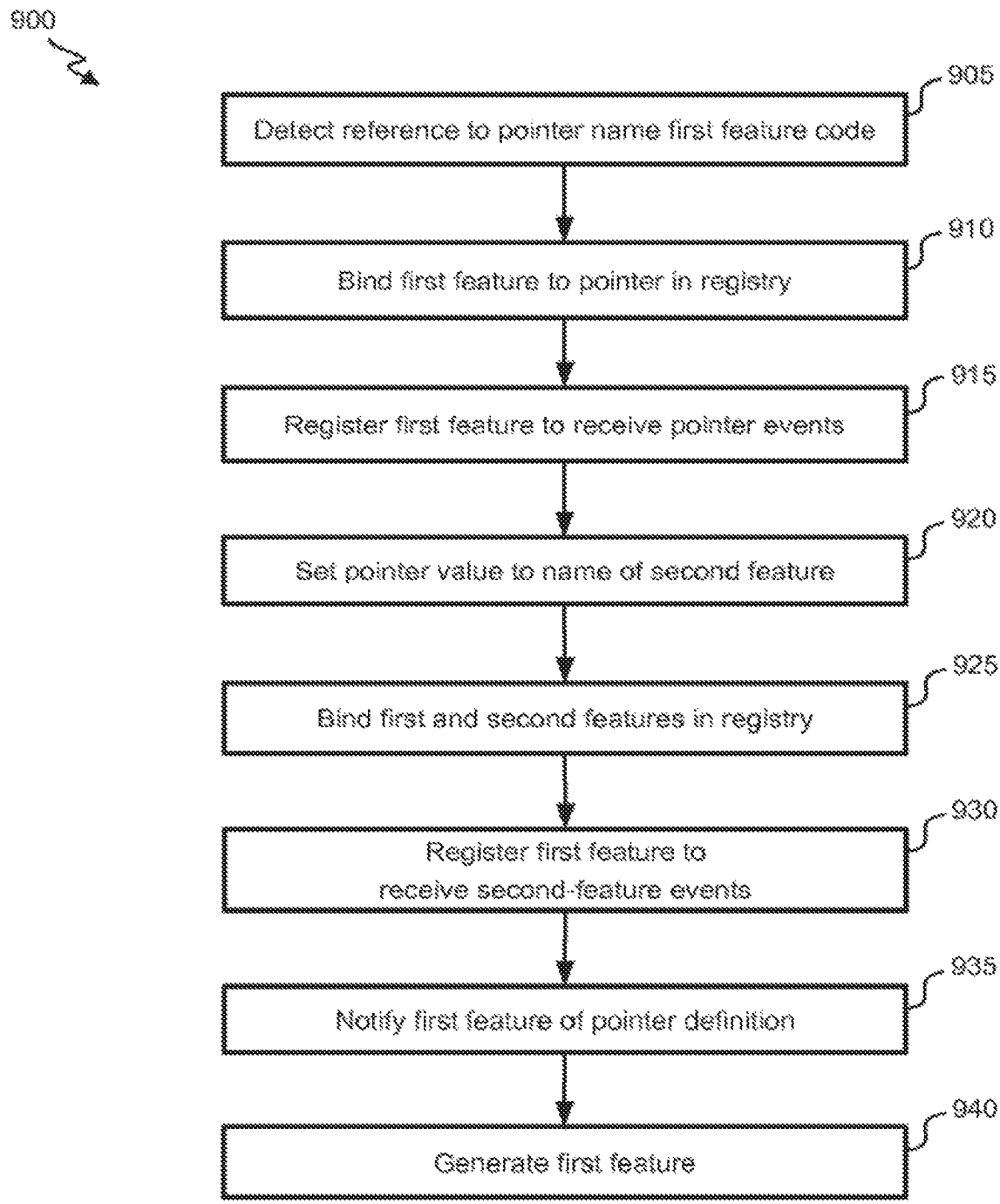
FIG. 9 illustrates a flowchart of an embodiment of a process for dynamically updating a first feature based on a dynamic pointer's definition in accordance with the disclosed embodiments.

FIG. 9 illustrates a flowchart of an embodiment of a process 900 for dynamically updating a first feature based on a dynamic pointer's definition. Process 900 begins at block 905, where feature engine 330 detects a reference to a pointer name in code of first app feature. The first app feature and the pointer can be ones already registered. If that is not the case, they can both be registered with central registry 335. In response to the detection at block 305, feature engine 330 binds the name of the first feature to the name of the pointer in central registry 335 at block 910. As a consequence of the binding, event detector 345 registers the first feature to receive notifications of events pertaining to the dynamic pointer at block 915.

Pointer engine 340 sets a value for the dynamic pointer to a name of a second feature at block 920. This pointer definition can occur after receiving a code or other input from developer 105 indicating that the second feature is the intended target for the pointer. It is possible that the second feature includes multiple variables, each of which can have a value. Thus, the pointer definition can then be formatted to not only identify the second feature but also to identify the variable of interest.

Feature engine 330 binds the name of the first feature to a name of the second feature (or name of a variable of the second feature) in registry at block 925. This binding is an indirect binding, as it is instituted due to the connection facilitated by the intermediate dynamic pointer. Event detector 345 registers the first feature to receive notifications of events pertaining to the second feature at block 930.

The setting of the pointer value at block 920 is itself an event, that the first feature was registered to be alerted of at block 915. Thus, at block 935, event detector 345 notifies the first feature of the pointer definition. In practice, this notification can include notifying feature engine 330 of the event and identifying the feature which may be affected by the change. In some instances, feature engine 330 will actively alter code of the first feature based on the event. For example, a feature engine 330 may generate a simplified code by replacing the reference to the dynamic pointer (or code defining any previously pointed to feature) with code of the pointed-to second feature. In some instances, no active code alteration is necessary, and the pointer operates to automatically incorporate the appropriate code.

Code executor 355 utilizes the original or modified code of the first feature (and/or the pointer value and/or code of the second feature) to generate the first app feature at block 940. It will be appreciated that the generation can include modifying a previously generated first app feature. The first app feature may then have a value equal to a value of the second feature, or a format or content of the first app feature may be selected based on the value of the second feature (e.g., utilizing an if command or other processing).

Figure 10:
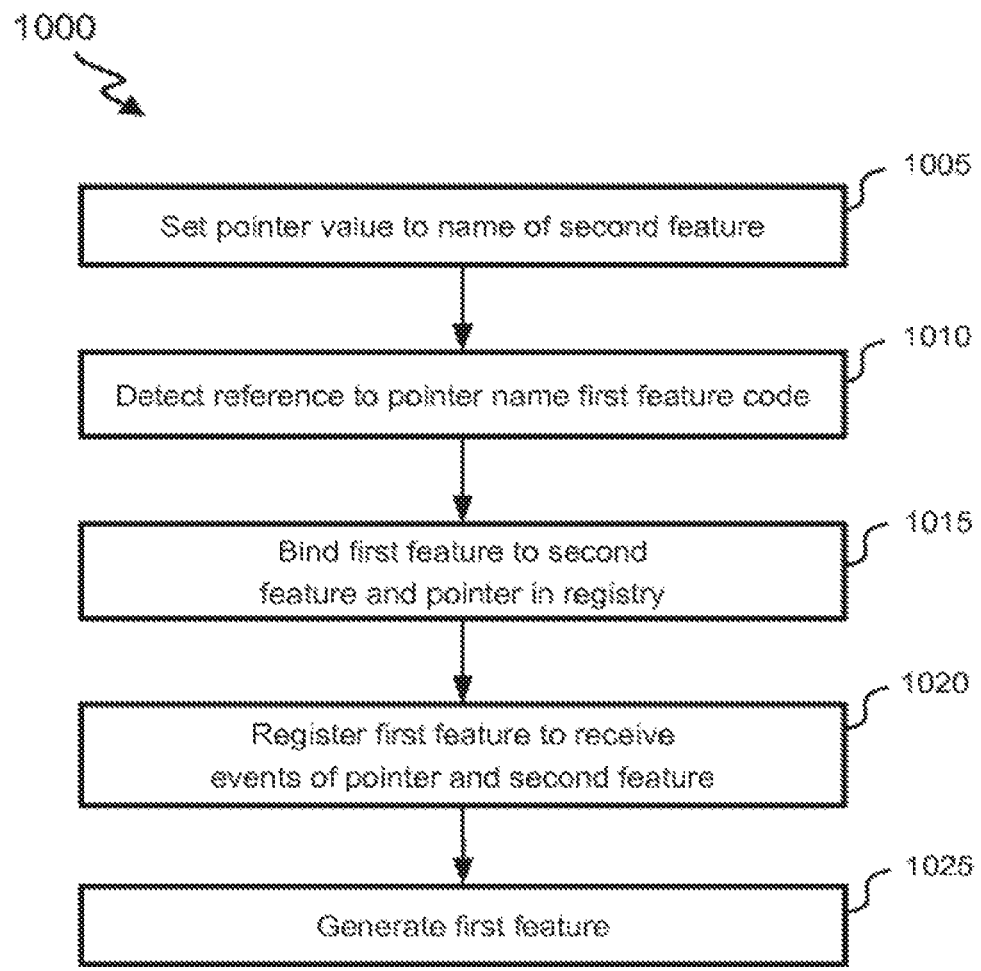
FIG. 10 illustrates a flowchart of an embodiment of a process for dynamically updating a first feature based on a dynamic pointer's definition in accordance with the disclosed embodiments.

FIG. 10 illustrates a flowchart of an embodiment of a process 1000 for dynamically updating a first feature based on a dynamic pointer's definition. Process 1000 begins at block 1005, where pointer engine 340 sets a value for the dynamic pointer to a name of a second feature. Feature engine 330 detects a reference to the name of the pointer in a code defining the first app feature at block 1010. Feature engine 330 then binds the name of a first feature to a name of the pointer and to a name of the second feature in central registry 335 at block 1015.

Event detector 345 registers the first feature to receive events pertaining to the pointer and/or to the second feature at block 1020. Code executor 355 generates the first app feature at block 1025, such that the operation and/or presentation of the first feature reflect a value of the second feature. In some instances, process 1000 further includes event detector 345 notifying the first feature of the pointer definition (e.g., by notifying feature engine 330). Even though no such event occurred after the first feature was registered to receive such events, the notification can nonetheless be sent such that the first feature can reflect the current pointer setting. As before, in some instances, a feature engine 330 generates a modified first-feature code that replaces a pointer reference with code of the second feature, and in some instances, no such modification is necessary.

In some instances, at least part of the order of the blocks in process 900 and 1000 reflects an actual order. That is, process 900 can illustrate a situation where the first app feature references a pointer prior to it being defined, and process 1000 illustrates a situation where the pointer is defined prior to the first app feature referencing the pointer. The use of central registry 335 dynamic pointers provides the flexibility to use either order, which can ease coding or (app defining) efforts and reduce error probabilities.

Figure 11:
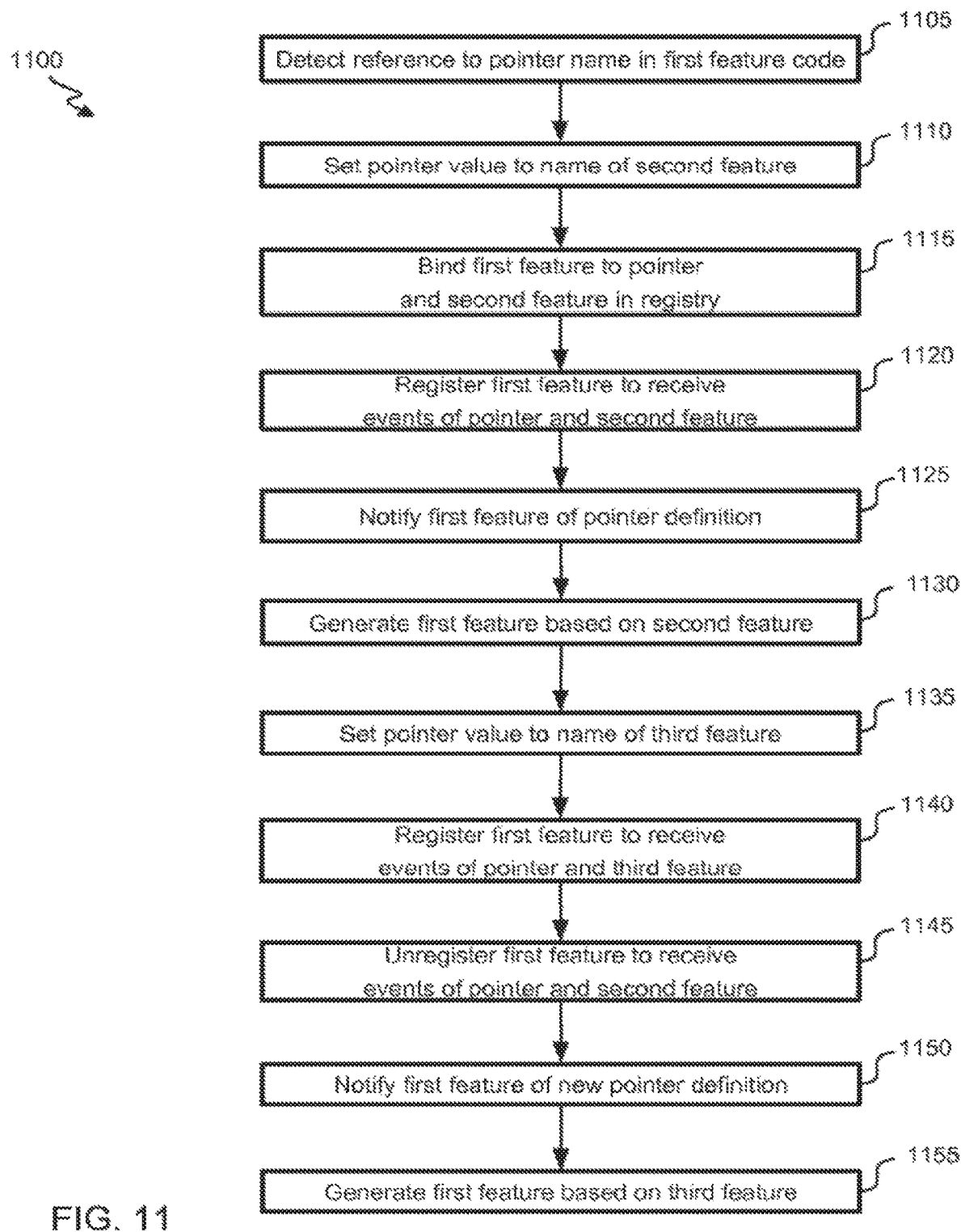
FIG. 11 illustrates a flowchart of an embodiment of a process for dynamically updating a first feature based on a dynamic pointer's definition in accordance with the disclosed embodiments.

FIG. 11 illustrates a flowchart of an embodiment of a process 1100 for dynamically updating a first feature based on a dynamic pointer's definition. Blocks 1105-1130 of process 1100 can substantially parallel similar blocks in process 900 and/or process 1000.

At block 1135, pointer engine 340 changes the value of the pointer by setting it to a name of a third feature. Consequentially, event detector 345 can adjust registrations appropriately. Specifically, event detector 345 registers the first feature to receive notifications of events pertaining to the third feature at block 1140, and event detector 345 unregisters the first feature to receive notifications of events pertaining to the second feature at block 1145.

The first feature was already registered to receive events pertaining to the pointer (block 1120), and thus, event detector 345 notifies the first feature of the new pointer definition at block 1150. Code executor 355 then generates the first app feature at block 1155, such that the operation and/or presentation of the first feature reflect a value of the third feature.

Figure 12:
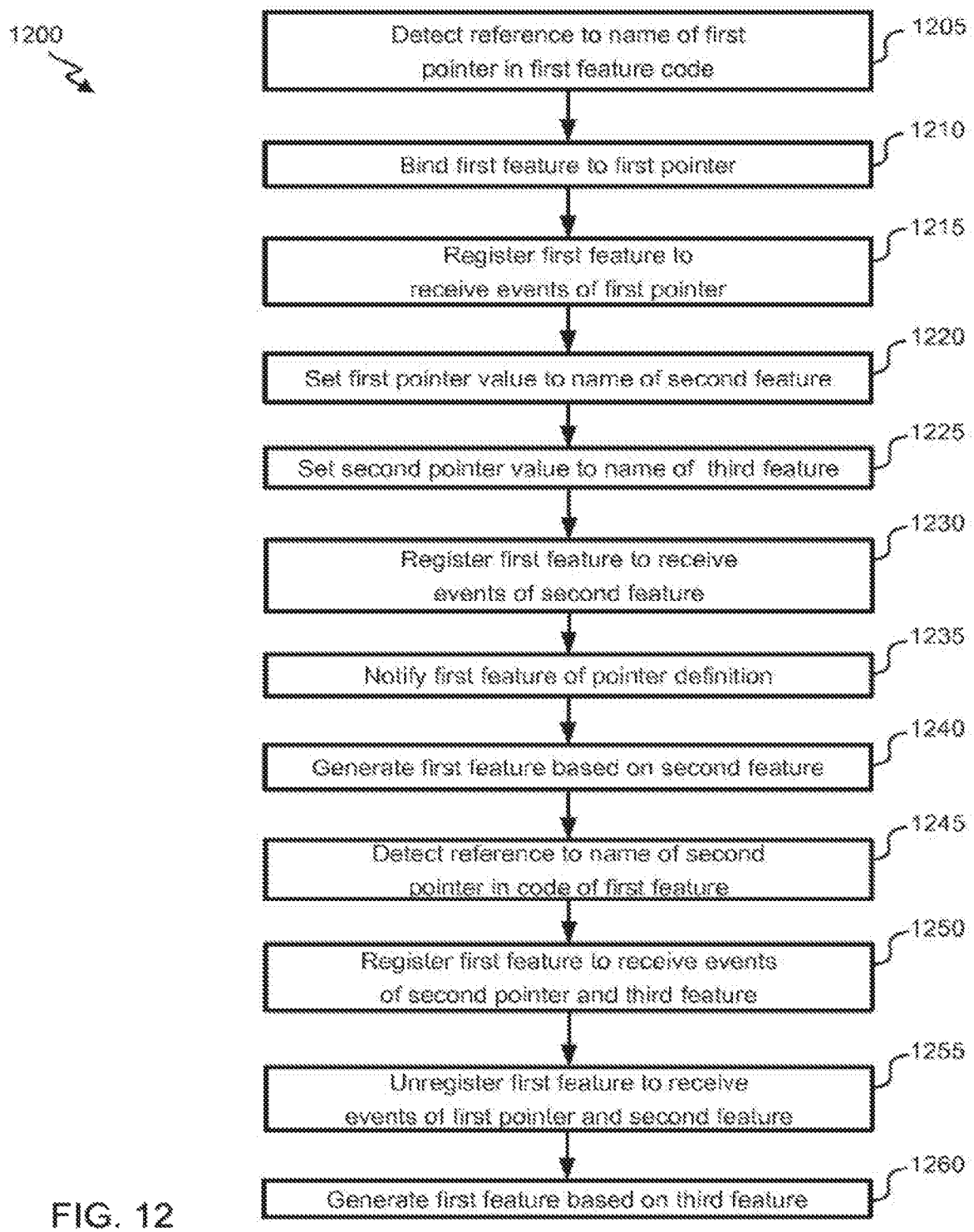
FIG. 12 illustrates a flowchart of an embodiment of a process for dynamically updating a first feature based on a definition of a newly referenced dynamic pointer in accordance with the disclosed embodiments.

FIG. 12 illustrates a flowchart of an embodiment of a process 1200 for dynamically updating a first feature based on a definition of a newly referenced dynamic pointer. Blocks 1205-1220 and 1230-1240 in process 1200 can substantially parallel similar blocks in process 900 and/or process 1000.

Meanwhile, process 1200 involves two pointers. Pointer engine 340 sets the second dynamic pointer to a name of a third app feature at block 1225. At block 1245, feature engine 330 detects that the reference in the first feature code changes from referencing the first pointer to referencing the second pointer.

Event detector 345 then adjusts registrations appropriately. Specifically, event detector 345 registers the first feature to receive notifications of events pertaining to the second pointer and/or the third feature at block 1250, and event detector 345 unregisters the first feature to receive notifications of events pertaining to the first pointer and/or the second feature at block 1255. Code executor 355 then generates the first app feature at block 1260, such that the operation and/or presentation of the first feature reflect a value of the third feature.

Figure 13:
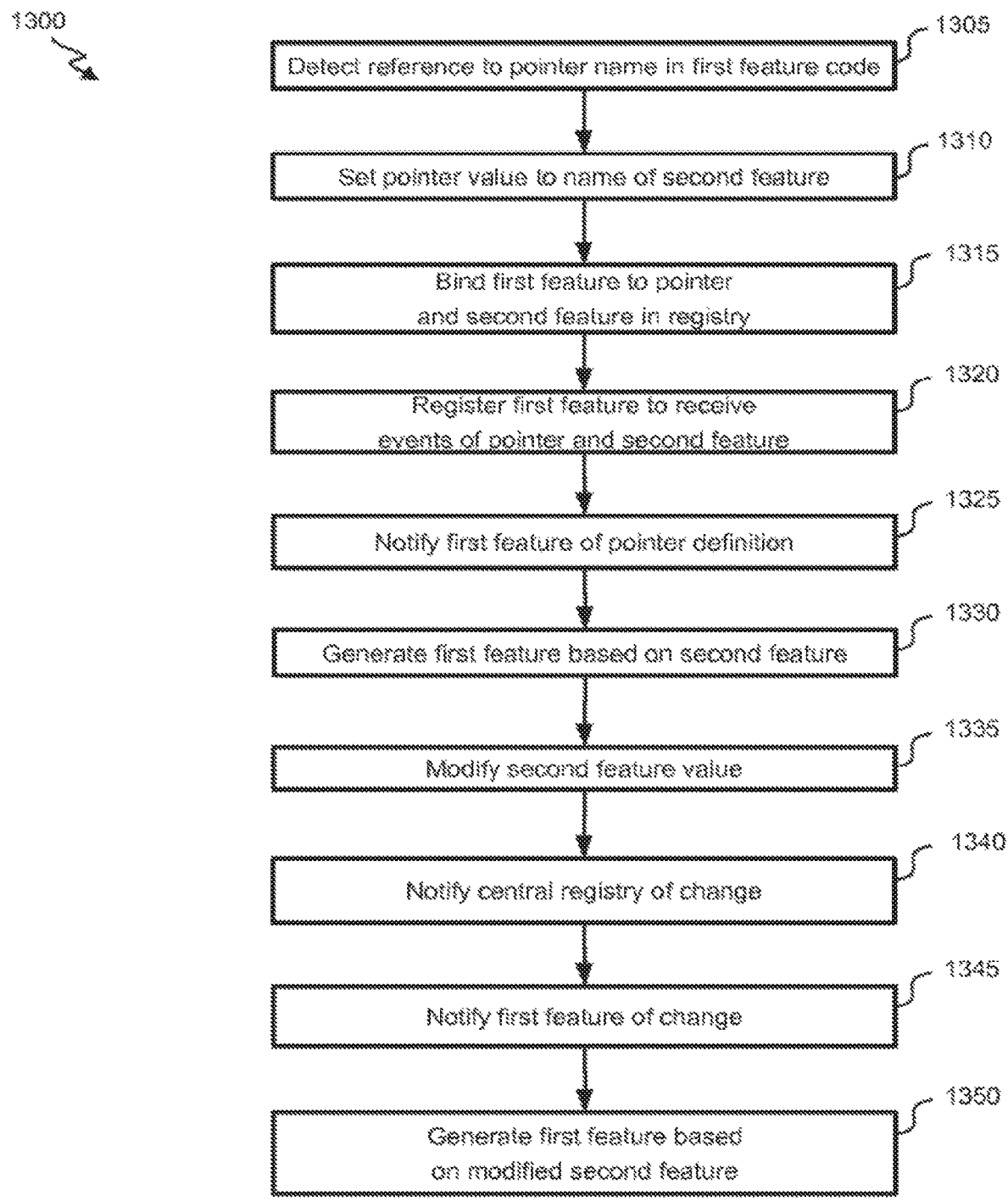
FIG. 13 illustrates a flowchart of an embodiment of a process for dynamically updating a first feature based on a change to a bound second feature in accordance with the disclosed embodiments.

FIG. 13 illustrates a flowchart of an embodiment of a process 1300 for dynamically updating a first feature based on a change to a bound second feature. Blocks 1305-1330 of process 1300 can substantially parallel similar blocks in process 900 and/or process 1000.

At block 1335, feature engine 330 modifies the second feature. The modification can be based, e.g., on input from developer 105, a database, a current time, user entries, etc. Thus, in some instances, the modification is due to a new result obtained responsive to automatic processing. Feature engine 330 notifies central registry 335 that the change occurred at block 1340. The notification may or may not include additional details as to what type of change occurred and/or what or who initiated the change.

Because the first feature was registered to receive notifications of events pertaining to the second feature, event detector 345 notifies the first feature of the change occurrence at block 1345. This notification also may or may not include additional details as to what type of change occurred. Code executor 355 then generates the first app feature at block 1350, such that the operation and/or presentation of the first feature reflect a value of the modified second feature.

Thus, processes 1100-1300 illustrate how the use of dynamic pointers and central registry 335 can allow a developer 105 to easily adjust the presentation and/or operation of a first feature—not by recoding major portions of the first feature—but by simply shifting a pointer definition, referencing a new feature or allowing system 150 to automatically process updates of other feature updates. This aspect can be particularly advantageous if developer 105 wishes to adjust the presentation and/or operation of many features in a similar manner. System 150 enables developer 105 to accomplish such an objective by adjusting a single variable, thereby also reducing the probability of introducing errors or presentation of unintended content in the app.

Figure 14:
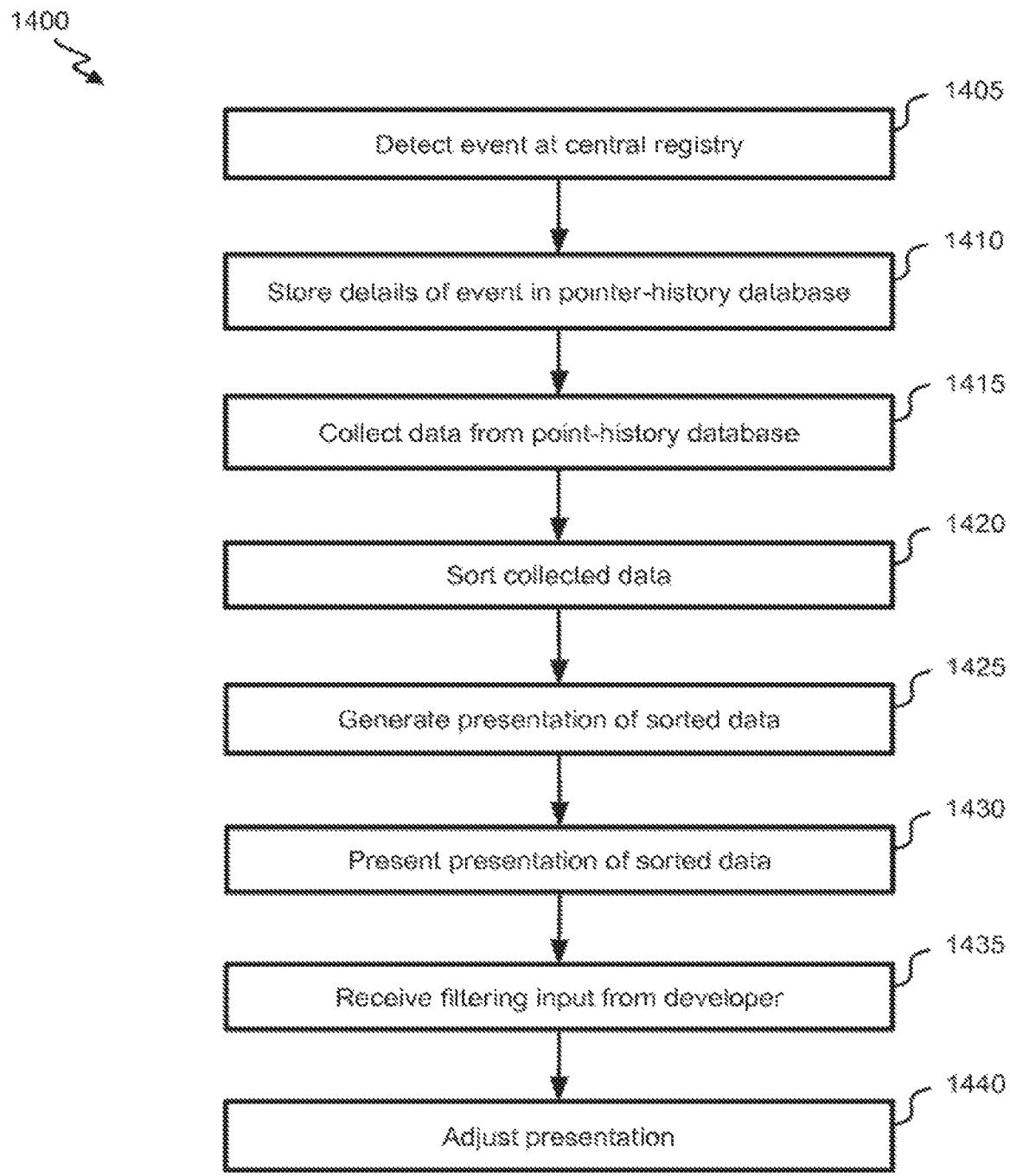
FIG. 14 illustrates a flowchart of an embodiment of a process for tracking and presenting changes in the central registry in accordance with the disclosed embodiments.

FIG. 14 illustrates a flowchart of an embodiment of a process 1400 for tracking and presenting changes in the central registry. Process 1400 begins at block 1405, where event detector 345 detects events at central registry 335. The events could include, e.g., a registration of a pointer, a registration of an app feature, a new or changed definition of a pointer, alert of new definition of an app feature, a new or changed direct binding from an app feature to a pointer, a new or changed indirect binding from an app feature to another app feature, a removal or a pointer, a removal of an app feature, a removal of a direct binding and/or a removal of an indirect binding.

Event detector 345 stores event details in event-history database 350 at block 1410. The details can include: an identification that an event occurred, an identification as to what type of event occurred (e.g., an identification of one of the above-listed event types), a date and time of the event, an identification of any party or circumstance initiating the event and/or an identification of one, more or all app features influenced by the event (e.g., due to binding).

Historical summarizer 360 collects event data from event-history database 350 at block 1415. The collected data can be all event date with dates and times within a time period, influencing a particular app feature or group of app features, pertaining to a particular app or developer, of one or more types, etc. In some instances, the selection of data is determined based on input from developer 105 (e.g., defining a time period of interest). Historical summarizer 360 sorts the collected data at block 1420. For example, events can be arranged chronologically. Additional sorting (e.g., separating new registrations from changes or removals) can also be performed.

Historical summarizer 360 generates a presentation of the sorted data at block 1425. The presentation can include, e.g., a timeline, such as the one illustrated in FIG. 5. The presentation can identify the events, the involved app features and/or pointers and/or the times of the events. Historical summarizer 360 presents the presentation of sorted data at block 1430. For example, the presentation can be presented on an interface screen to a developer 105.

Historical summarizer 360 receives filtering input from developer at block 1435. The filtering input can, e.g., define one or more time boundaries, an event type of interest, one or more app features of interest, one or more pointers of interest, an identification of whether automatic or developer-initiated events are of interest, etc. Historical summarizer 360 may then recollect and/or resort data based on the filtering. In one instance, block 1435 includes the developer selecting and deleting an event, which may merely delete the event from view or have an effect of reversing the event's occurrence.

Historical summarizer 360 adjusts the presentation at block 1440. The adjusted presentation can conform to the filtering input received at block 1435. The presentation adjustment can be dynamic and in real-time (e.g., zooming in or out of a timeline) or can prompt a new presentation to occur or to be transmitted.

Figure 15:
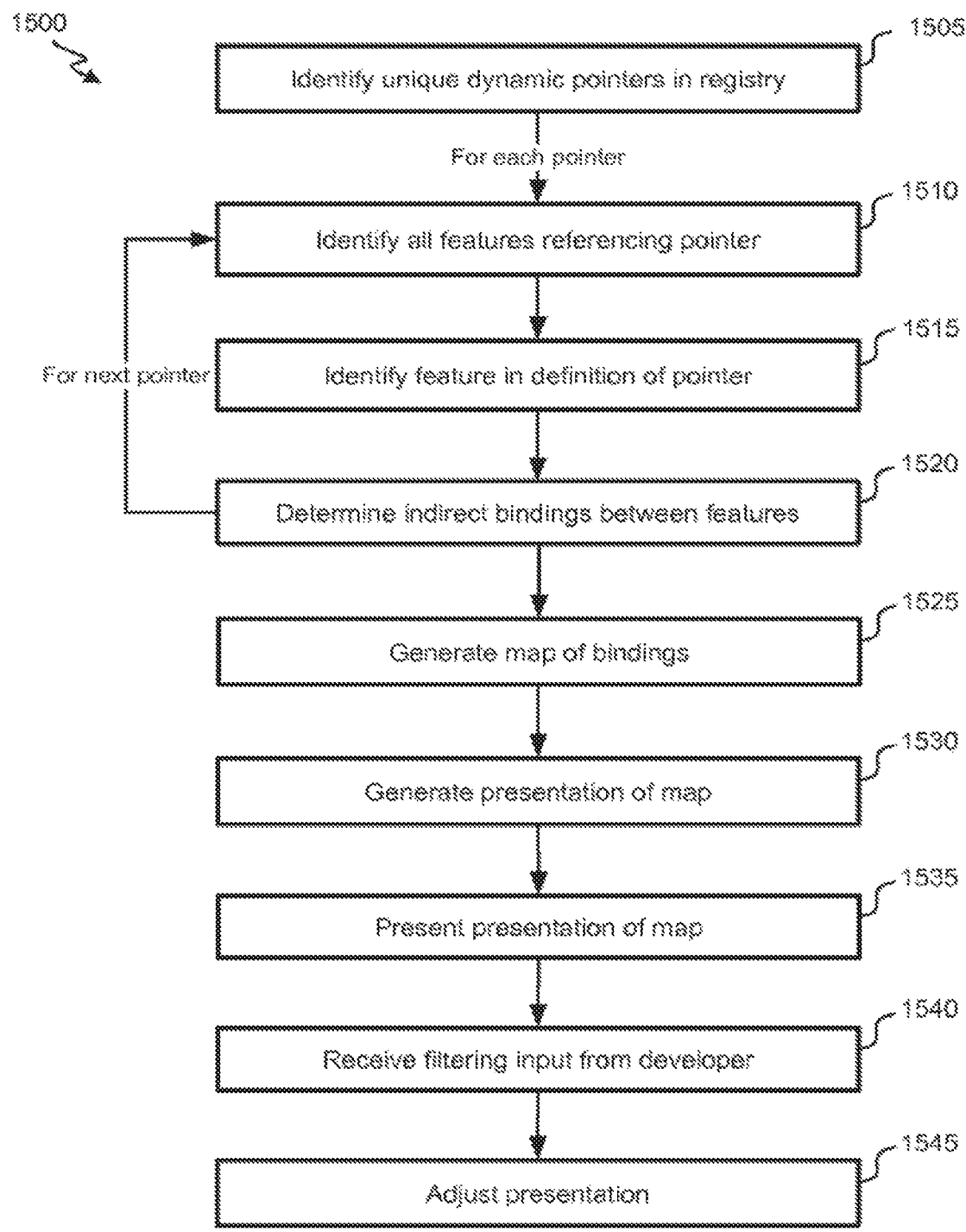
FIG. 15 illustrates a flowchart of an embodiment of a process for identifying interrelationships between features and dynamic pointers in accordance with the disclosed embodiments.

FIG. 15 illustrates a flowchart of an embodiment of a process 1500 for identifying interrelationships between features and dynamic pointers. Process 1500 begins at block 1505, where map summarizer 365 identifies unique dynamic pointers in central registry 335.

For one of the identified pointers, feature engine 330 identifies all features referencing the dynamic pointer at block 1510. For example, feature engine 330 can identify all app features directly bound to the pointer. Feature engine 330 identifies which app feature (and/or app-feature variable) is present in a definition of dynamic pointer at block 1515. Feature engine 330 determines indirect bindings between features based on references and definition at block 1520. Blocks 1510-1520 are repeated for each pointer. It will be appreciated that, in some instances, block 1505 is omitted from process 1500 and/or feature engine 330 determines indirect bindings in response to central registry 335 being changed in a manner than will influence current indirect bindings.

Map summarizer 365 generates map of bindings at block 1525. The map can include direct bindings, pointer definitions and/or indirect bindings. Thus, in one instance, the map only includes indirect bindings and does not include identifiers of pointers. The map can be constructed to focus, not primarily on individual bindings, but to show how app features and/or pointers are interconnected more globally (e.g., illustrating convergence and divergence of bindings).

Map summarizer 365 generates a presentation of the map at block 1530. The presentation can include identifiers of app features, pointers and one or more types of bindings determined at block 1520. Examples of maps are illustrated in FIGS. 4A, 4B and 6. Map summarizer 365 presents the presentation of the map at block 1530. For example, the presentation can be presented via an interface of an app or website or emailed (e.g., to a developer).

Map summarizer 365 receives filtering input from developer 105 at block 1540. Map summarizer adjusts the presentation in accordance with the filtering input at block 1540. Filtering input may identify one or more types of app features, types of pointers and/or types of bindings of interest. Filtering may identify a time point. Thus, in one instance, a developer 150 can, e.g., slide a marker across a time bar such that the presented map reflects the bindings current at the represented time. In order to adjust the presentation, map summarizer 365 may regenerate the map. In another instance (e.g., where the filtering input defines a time point of interest), map summarizer 365 may identify events that occurred between a previous time point identified and the recent one, such that the map can be adjusted based on the events.

Figure 16:
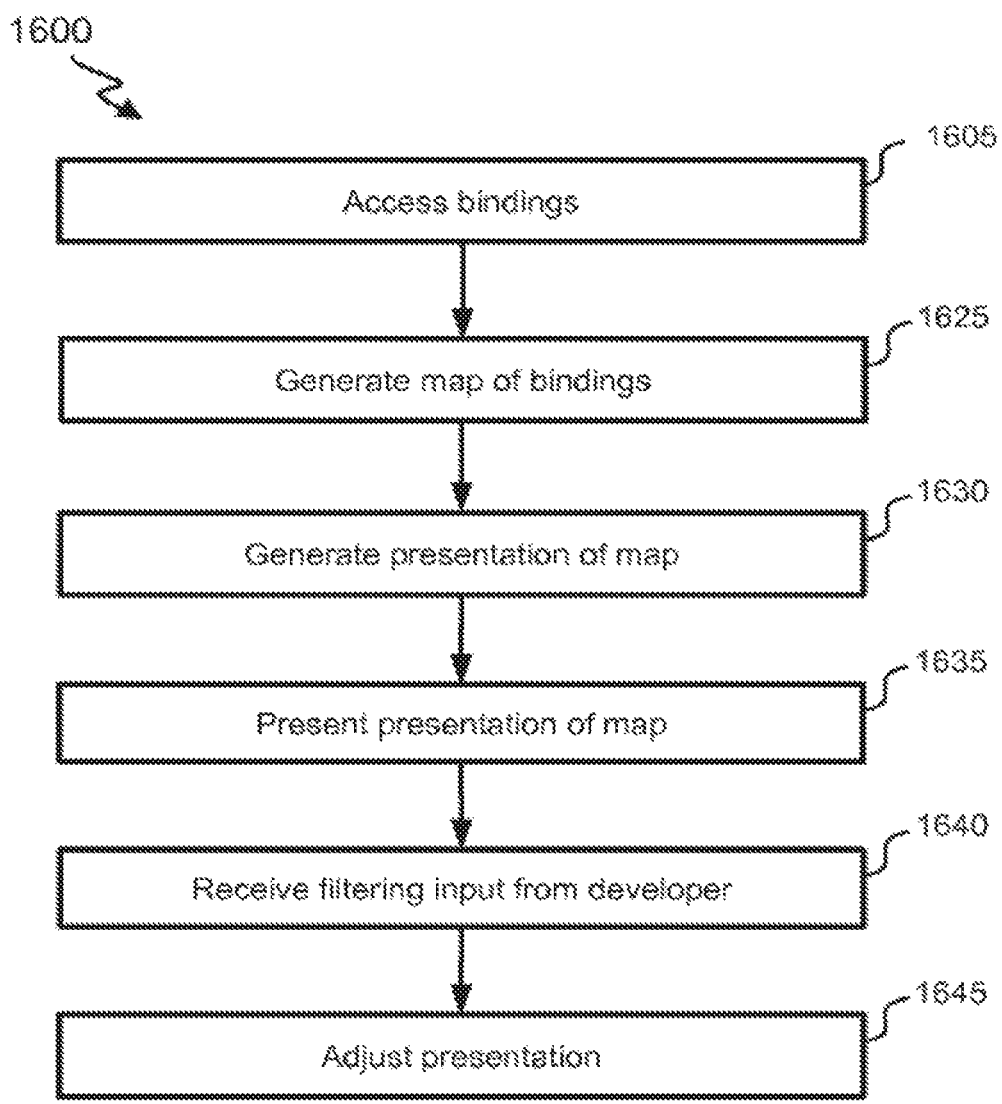
FIG. 16 illustrates a flowchart of an embodiment of a process for identifying interrelationships between features and dynamic pointers in accordance with the disclosed embodiments.

FIG. 16 illustrates a flowchart of an embodiment of a process 1600 for identifying interrelationships between features and dynamic pointers. Blocks 1625-1645 can substantially parallel corresponding blocks in process 1500. However, in process 1600, rather than determining indirect bindings between features, map summarizer 365 merely accesses the indirect bindings already determined (e.g., by feature engine 330) and stored in central registry 335.

It will be appreciated that embodiments herein can relate to the processing, storing and/or presentation of structured, semi-structured and/or unstructured data. For example, a developer 105 can build an app that selectively collects portions of the data, which are then analyzed, summarized and/or presented to users 115. Developer 105 can allow user 115 to interact with the data in specified manners (e.g., to adjust a data-summarization level or, correspondingly, a level of detail).

An app feature (e.g., a query) can include or be based on such data. To illustrate, a query can identify a number of stored events within a time period having a particular field value. Other app features can depend on the data-dependent app feature via a dynamic pointer, as described above. In another illustration, a dynamic pointer can be set to point to a portion of the data itself (e.g., a collection of field values).

Data can include, for example:

(1) Log data: types of data access attempts, times of data access attempts, users attempting access, access successes, subsequent user behaviors (e.g., subsequently accessed data or access reattempts), error occurrences, warning occurrences, serving resources.

(2) Message data (e.g., email data): sender identifiers, recipient identifiers, transmission times, subject lines, message sizes, message formats, message contents.

(3) Media data: identifiers of movie, picture or sound files; values in files; size of files; entity that uploaded or owns the files; file types; keywords.

(4) Sensor data (e.g., light sensor, motion sensor, accelerometer): sensor identifiers, sensor locations, sensor values.

(5) User activity data (e.g., web-access data): web-page identifiers, user identifiers, locations of users, IP addresses of users, devices used by users via access, sequences of page access, access durations, information entered via web pages.

(6) Social-network data: identifiers of users connected to each other, types of connections, times of connection initiation.

(7) Inventory data: identifiers of products, product prices, inventory remaining, inventory sold, sale locations, sale prices, profits, manufacturer identifiers.

(8) Economic data (e.g., stock data, home-sale data): buyer identifiers, purchase times, identifiers of purchased commodity, seller identifiers, location of purchased commodity (if applicable).

(9) Employment data: employer identifiers, employee identifiers, employment locations, position types, hire times, termination times, promotion times, promotion types, connections between employees (e.g., between supervisors and supervised employees), salaries.

(10) Medical data (e.g., MRI data, EEG data, medical records): patient identifiers, test identifiers, test data, analysis data.

(11) Genomic data: species identifiers, genes, intra-species reliability, nucleotides, gene identifiers, behavior or disease couplings (e.g., identifying a set of nucleotides being part of gene which is linked to a particular disease).

(12) Search data: search occurrence, search terms, search constraints, users conducting searches, databases searched, results returned, results selected by (e.g., clicked on) by users.

(13) Call data: phone number and/or user initiating calls, phone number and/or user receiving calls, whether calls were answered, time of call initiations, duration of calls.

(14) Electrical data (e.g., electricity usage): user identifiers, times of usage, amounts of usage, sources of electricity used (e.g., coal, natural gas, nuclear, solar, wind, etc.).

(15) Neuroscience data (e.g., recordings from neurons): times of recordings, recording values, cell identifiers, amplification settings, users owning recordings.

As implied from the above examples, data stored and/or used can include a plurality of events (or entries), each of which can include values for particular fields. For example, in the "message data" instance, each event can correspond to a message, and each event can include a value for each of the following fields: sender, recipient, message time, subject, message size, message format, and message content.

Figure 17:
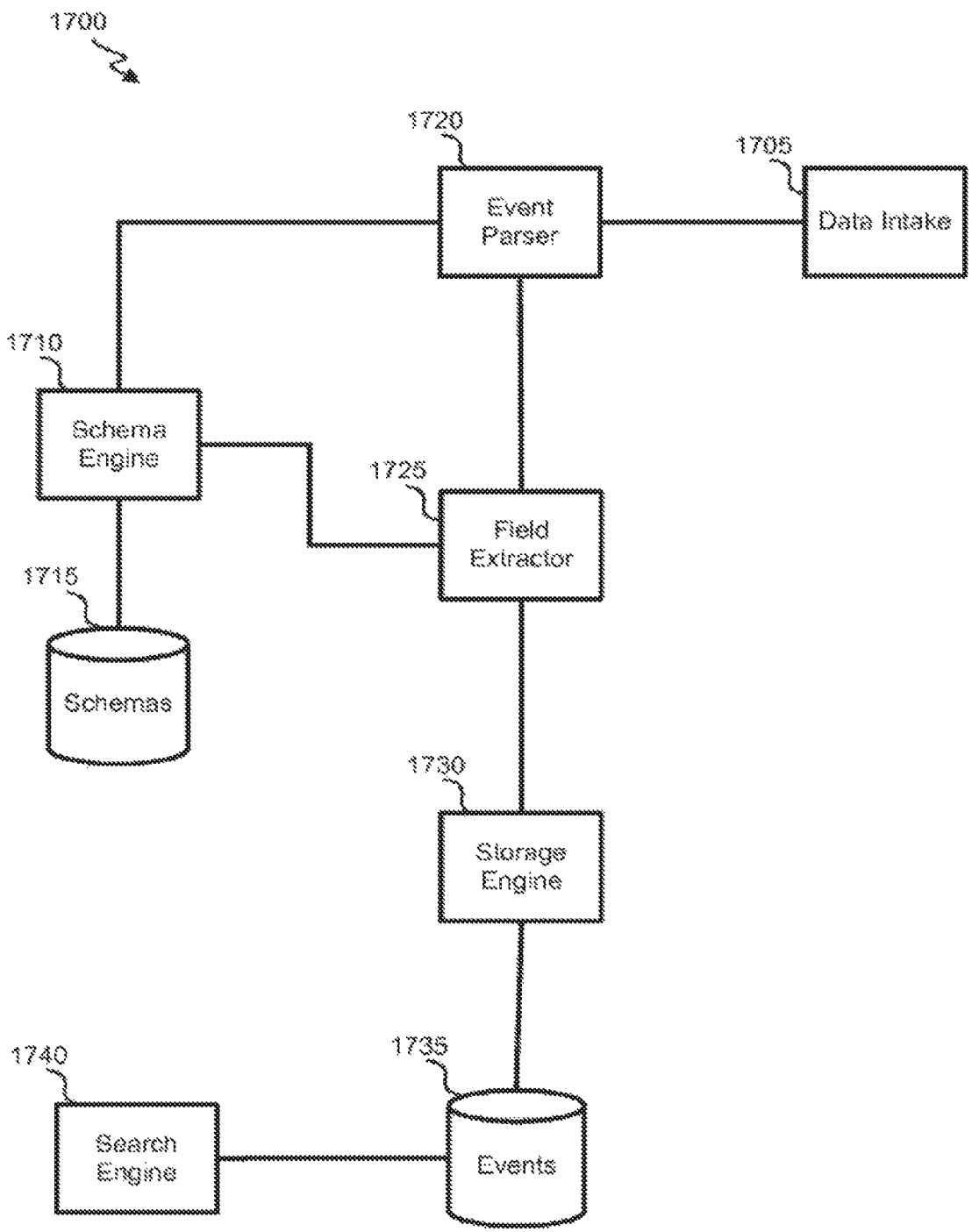
FIG. 17 shows a block diagram of an embodiment of an app data management system in accordance with the disclosed embodiments.

FIG. 17 shows a block diagram of an embodiment of app data management system 1700. Data intake 1705 receives data, e.g., from a data provider, developer, or client. The data can include automatically collected data, data uploaded by users, or data provided by the data provider directly. In some instances, the data includes a structure that allows for individual events and field values within the events to be easily identified. The structure can be predefined and/or identified within the data. For example, various strings or characters can separate and/or identify fields. As another example, field values can be arranged within a multi-dimensional structure, such as a table. In some instances, data partly or completely lacks an explicit structure. For example, a continuous data stream can include multiple events, each with multiple field values.

A schema engine 1710 identifies an applicable schema that can be used to extract specific field values by imposing structure on data. Specifically, a schema can be "bound" to data, by breaking a data stream (e.g., a byte stream) into events and/or extracting field values, such as a time stamp. Schema binding can occur while receiving data, prior to storing data, while storing data, while processing data, while responding to a search query or some combination of the above (e.g., separating data into events at intake and extracting field values from events while responding to a search query). Late binding schema can be used, which imposes structure on the data at query time rather than at storage or ingestion time.

In structured data, an applicable schema is known, such that field values can be reliably extracted. In such instances, schema engine 1710 can receive the schema from a developer, data provider, developer or other client, or schema engine 1710 can identify the schema from the data itself (e.g., with headers or tags identifying various fields, such as <event><message time>2013.01.05.06.59.59</> . . . </>). In unstructured data, schema engine 1710 can estimate the schema automatically or on command. For example, schema engine 1710 may identify patterns of characters or breaks within the data stream and estimate field breaks. Received or estimated schemas are stored in a schema database 1715. Schema engine 1710 can perform the schema estimation once or multiple times (e.g., continuously or at routine intervals). In some instances, a developer, client or data provider can provide input indicating a satisfaction with or correction to estimated schema.

Using the schema, an event parser 1720 can separate the received data into events. For example, event parser 1720 can separate data between particular start and stop tags, or separate data within a table's row, or separate data within particular character numbers in the data. Also using the schema, a field extractor 1725 can extract various field values. In some instances, field extractor 1725 further attaches a semantic meaning to the extracted field values (e.g., based on a length and/or character types of the field values). Field extractor 1725 can further convert field values into a particular (e.g., standard or easily searchable) format.

A storage engine 1730 can store data in an event database 1735. It will be appreciated that event database 1735 can include multiple databases or sub-databases. Event database 1735 can be stored in working, short-term and/or long-term memory. In various instances, event database 1735 can include raw data, extracted events or extracted field values. It will be appreciated that, in some instances, part of the data received by data intake 1705 can be deleted or not stored (e.g., field breaks).

Events and/or field values can be stored at locations based on a field value. For example, a field value identifying a message sender may be stored in one of ten databases, the database being chosen based on a message time. In some instances, rather than grouping various data components at specific storage areas, event database 1735 includes an index that tracks identifiers of events and/or fields and of field values. Selective storage grouping can be referred to as storing data in "buckets". Bucket definitions can be fixed or defined based on input from a data provider, developer or client. Input and/or automatic rules can be used to add, merge or delete buckets.

A search engine 1740 can subsequently access and search all or part of event database. The search can be performed upon receiving a search query from a developer, user or client. In some instances, a defined search query is repeatedly performed. Segregation of data into events and/or fields can allow for more efficient searching. The search may include, e.g., a request to return values for one or more first fields for all events having specified values (e.g., specific values or values within a specific range) for one or more second fields. To illustrate, a developed may request that that sender identifiers be returned for all message events having a subject with three or more non-alphanumeric characters. Upon retrieving the event data of interest, search engine 1740 may further process the results (e.g., to obtain an average, frequency, count or other statistic). Search engine 1740 can return the search result to the developer, client or user, e.g., via an interface (such as a web interface or app interface) or email.

Figure 18:
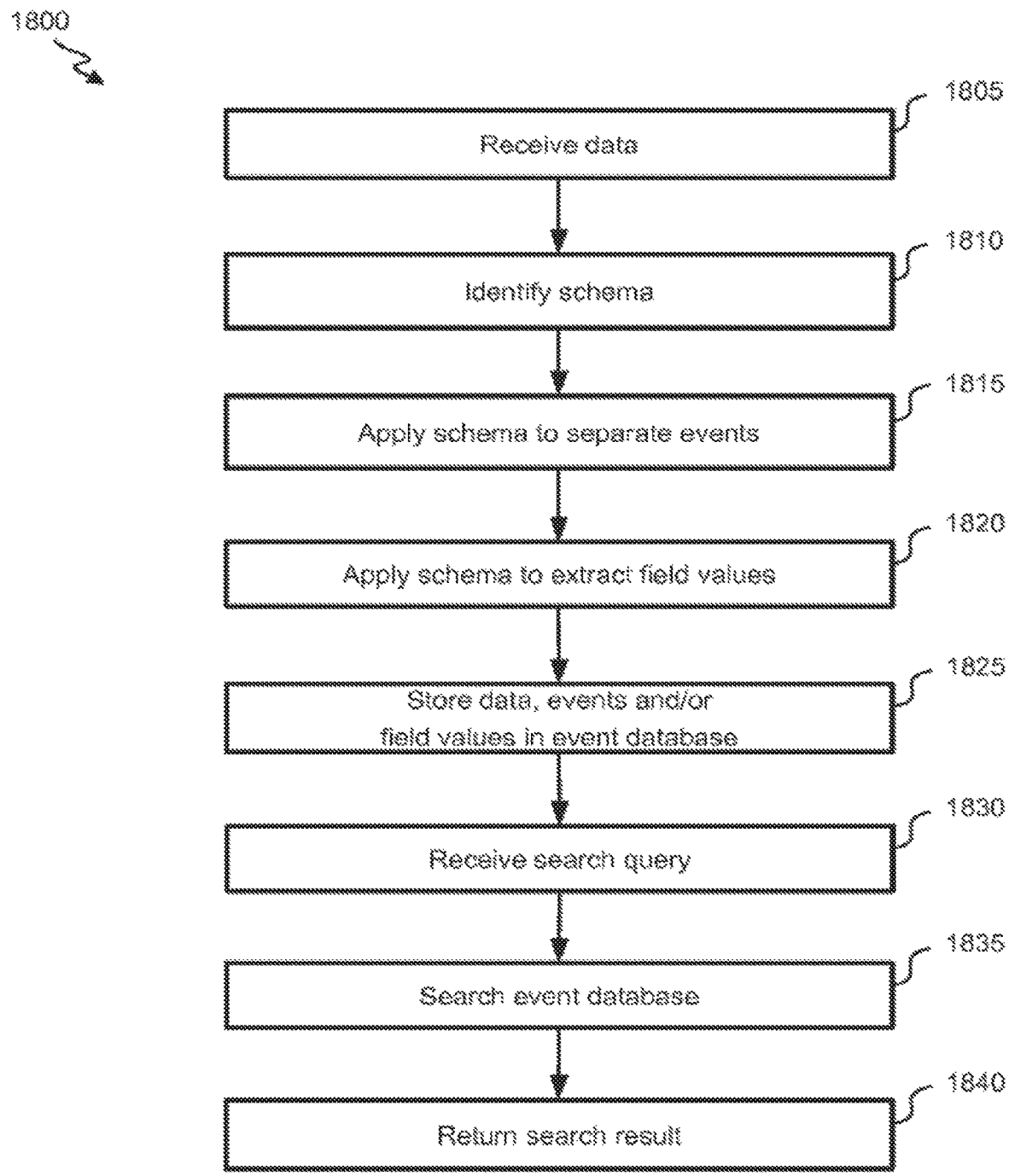
FIG. 18 illustrates a flowchart of an embodiment of a process for storing and using big data in accordance with the disclosed embodiments.

FIG. 18 illustrates a flowchart of an embodiment of a process 1800 for storing and using big data. Process 1800 begins at block 1805, where data intake 1705 receives data. Schema engine 1710 identifies an applicable schema at block 1810. Event parser 1820 applies the schema to separate the data into events at block 1815. Field extractor 1825 applies the schema to extract field values from the events at block 1820. Storage engine 1730 stores raw data, events and/or field values in event database 1735 (e.g., by assigning the data, events and/or field values to buckets based on particular field values) at block 1825.

Search engine 1740 receives a search query from a searcher (e.g., client, developer or user) at block 1830. The search query can include one or more criteria which can specify or constrain field values. Search engine 1740 searches event database 1735 at block 1835. The search can entail searching only some of event database 1735 (e.g., that including field values of interest). The search can produce identifiers of events of interest. Search engine 1740 may then collect other field values for those events of interest. A search result can include the collected other field values and/or a processed version thereof. Search engine 1740 returns the search result to the searcher at block 1740.

It will be appreciated that system 1700 and/or process 1800 can be modified such that schema is not bound to data (or only a portion of the schema is bound to data) immediately following intake. For example, schema could instead be bound prior to or during storage of the data or at a query time (e.g., subsequent to block 1830 of process 1800).

The detailed description that appears above is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a system reads and executes the code and/or data stored on the non-transitory computer-readable storage medium, the system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Moreover, the foregoing descriptions of disclosed embodiments have been presented only for purposes of illustration and description. They are not intended to be exhaustive or to limit the disclosed embodiments to the forms disclosed. Accordingly, many modifications and variations will be apparent to practitioners skilled in the art.

Additionally, the above disclosure is not intended to limit the disclosed embodiments. The scope of the disclosed embodiments is defined by the appended claims.

Having thus described the invention, what is claimed is:

1. A computer-implemented method, comprising:
   identifying, from a data structure of a computer system, a set of unique application features of an application under development;
   searching for bindings that identify which of the unique application features are bound together and directionality of the bindings;
   generating a map that graphically represents the unique application features as nodes and the bindings as lines between the nodes,
   wherein one of the lines is between a first of the nodes representing a first of the unique application features and a second of the nodes representing a second of the unique application features,
   wherein the line indicates that the computer system is configured to notify the first unique application feature upon detection of an event associated with the second unique application feature; and
   outputting the map to a developer device.

2. The computer-implemented method of claim 1, wherein the line is an arrow.

3. The computer-implemented method of claim 1, wherein the computer system is configured to notify registered application features in the data structure of associated events based on token entries that map token names to associated variables containing token values received from outputs of the unique application features.

4. The computer-implemented method of claim 1, wherein the map depicts the bindings existing at a time identified by a user input from the developer device.

5. The computer-implemented method of claim 1, wherein the map comprises a restricted map depicting a subset of the bindings associated with a subset of the unique application features identified by a user input.

6. The computer-implemented method of claim 1, wherein the map is an interactive map configured to adjust the bindings in the data structure in response to a user input interacting with a corresponding portion of the map.

7. The computer-implemented method of claim 1, wherein the data structure is a central registry, wherein the computer system is configured to notify a registered application feature in the central registry of associated events comprising one or more of a new registry entry registration, a new application feature registration, a new binding between an application feature and a registry entry, a change to a binding between an application feature and a registry entry, a removal of a registry entry, or a removal of an application feature.

8. The computer-implemented method of claim 1, wherein the unique application features include one or more of:
   a visual element in a user interface (UI);
   an input element in a UI;
   a function that produces a data value;
   a token containing a variable that holds a data value; or
   another data source.

9. The computer-implemented method of claim 1, wherein outputting the map comprises causing presentation of the map on a graphical user interface of the developer device.

10. The computer-implemented method of claim 1, wherein the map includes a timeline.

11. A non-transitory computer-readable storage medium storing instructions that when executed by a computer cause the computer to perform a method comprising:
   identifying, from a data structure of a computer system, a set of unique application features of an application under development;
   searching for bindings that identify which of the unique application features are bound together and directionality of the bindings;
   generating a map that graphically represents the unique application features as nodes and the bindings as lines between the nodes,
   wherein one of the lines is between a first of the nodes representing a first of the unique application features and a second of the nodes representing a second of the unique application features, wherein the line indicates that the computer system is configured to notify the first unique application feature upon detection of an event associated with the second unique application feature; and outputting the map to a developer device.

12. The non-transitory computer-readable storage medium of claim 11, wherein the line is an arrow.

13. The non-transitory computer-readable storage medium of claim 11, wherein the computer system is configured to notify registered application features in the data structure of associated events based on token entries that map token names to associated variables containing token values received from outputs of the unique application features.

14. The non-transitory computer-readable storage medium of claim 11, wherein the map depicts the bindings existing at a time identified by a user input from the developer device.

15. The non-transitory computer-readable storage medium of claim 11, wherein the map comprises a restricted map depicting a subset of the bindings associated with a subset of the unique application features identified by a user input.

16. The non-transitory computer-readable storage medium of claim 11, wherein the map is an interactive map configured to adjust the bindings in the data structure in response to a user input interacting with a corresponding portion of the map.

17. The non-transitory computer-readable storage medium of claim 11, wherein the data structure is a central registry, wherein the computer system is configured to notify a registered application feature in the central registry of associated events comprising one or more of a new registry entry registration, a new application feature registration, a new binding between an application feature and a registry entry, a change to a binding between an application feature and a registry entry, a removal of a registry entry, or a removal of an application feature.

18. The non-transitory computer-readable storage medium of claim 11, wherein the unique application features include one or more of:
   a visual element in a user interface (UI);
   an input element in a UI;
   a function that produces a data value;
   a token containing a variable that holds a data value; or
   another data source.

19. The non-transitory computer-readable storage medium of claim 11, wherein outputting the map comprises causing presentation of the map on a graphical user interface of the developer device.

20. A computer system, comprising:
   at least one processor and at least one associated memory storing instructions that, when executed, cause the at least one processor to perform a method comprising:
      identifying, from a data structure of the computer system, a set of unique application features of an application under development;
      searching for bindings that identify which of the unique application features are bound together and directionality of the bindings;
      generating a map that graphically represents the unique application features as nodes and the bindings as lines between the nodes,
      wherein one of the lines is between a first of the nodes representing a first of the unique application features and a second of the nodes representing a second of the unique application features,
      wherein the line indicates that the computer system is configured to notify the first unique application feature upon detection of an event associated with the second unique application feature; and
      outputting the map to a developer device.

* * * * *